United States Patent
Rios et al.

(10) Patent No.: US 12,497,022 B2
(45) Date of Patent: Dec. 16, 2025

(54) METHODS AND APPARATUS FOR MITIGATING FUEL IN OIL

(71) Applicant: JAGUAR LAND ROVER LIMITED, Warwickshire (GB)

(72) Inventors: Samuel Rios, Coventry (GB); Ben Kisiel, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 66 days.

(21) Appl. No.: 18/703,400

(22) PCT Filed: Oct. 19, 2022

(86) PCT No.: PCT/EP2022/079060
§ 371 (c)(1),
(2) Date: Apr. 22, 2024

(87) PCT Pub. No.: WO2023/072700
PCT Pub. Date: May 4, 2023

(65) Prior Publication Data
US 2024/0416892 A1    Dec. 19, 2024

(30) Foreign Application Priority Data

Oct. 25, 2021  (GB) ...................... 2115313

(51) Int. Cl.
*B60W 20/15*    (2016.01)
*F02D 29/02*    (2006.01)
(Continued)

(52) U.S. Cl.
CPC ............. *B60W 20/15* (2016.01); *F02D 29/02* (2013.01); *F02D 41/062* (2013.01); *F02N 11/08* (2013.01)

(58) Field of Classification Search
CPC ...... B60W 20/15; F02D 29/02; F02D 41/062; F02N 11/08
(Continued)

(56) References Cited

U.S. PATENT DOCUMENTS 6,334,834 B1 * 1/2002 Mizutani ................ F02D 29/02
                                                477/203
2003/0213296 A1 * 11/2003 Kaigawa ................ F16H 61/16
                                                73/115.02

(Continued)

FOREIGN PATENT DOCUMENTS

JP    2007231838 A    9/2007

OTHER PUBLICATIONS

International Search Report and Written Opinion of the International Searching Authority for International application No. PCT/EP2022/079060 dated Feb. 21, 2023.

(Continued)

*Primary Examiner* — Kerri L McNally
(74) *Attorney, Agent, or Firm* — Carlson, Gaskey & Olds, P.C.

(57) ABSTRACT

A method (200) and apparatus 10-2 for carrying out the method of mitigating fuel in oil in an internal combustion engine of a hybrid electric vehicle, the method comprising: detecting a first engine start of a drive cycle when the vehicle speed is greater than zero (210); detecting a temperature of engine oil in the engine at the first engine start of the drive cycle (220); determining if the temperature of the engine oil is below an engine oil temperature threshold (230); when the temperature of the engine oil is determined to be below the engine oil temperature threshold, inhibiting an engine stop for a first predetermined time period unless the vehicle speed reaches zero (240).

8 Claims, 13 Drawing Sheets

(51) Int. Cl.
*F02D 41/06* (2006.01)
*F02N 11/08* (2006.01)

(58) Field of Classification Search
USPC ........................................ 340/450.3
See application file for complete search history.

(56) References Cited

U.S. PATENT DOCUMENTS

| | | | |
|---|---|---|---|
| 2011/0203411 A1* | 8/2011 | Maruyama | F16H 59/72 |
| | | | 74/731.1 |
| 2012/0042845 A1* | 2/2012 | Kanai | F01M 1/10 |
| | | | 123/196 AB |
| 2017/0197622 A1* | 7/2017 | Books | B60K 6/20 |
| 2018/0258897 A1* | 9/2018 | Leone | F02N 11/0851 |
| 2021/0156351 A1* | 5/2021 | Harmeyer | F02N 11/0862 |

OTHER PUBLICATIONS

Search Report under Section 17 for Application No. GB2115313.5 dated Mar. 29, 2022.

\* cited by examiner

METHODS AND APPARATUS FOR MITIGATING FUEL IN OIL

TECHNICAL FIELD

The present disclosure relates to methods and apparatus for mitigating fuel in oil, and particularly, but not exclusively, to methods and apparatus for mitigating fuel in oil in an internal combustion engine of a hybrid electric vehicle. Aspects of the invention relate to a method, to an apparatus, and to a vehicle.

BACKGROUND

It is known that in internal combustion engines fuel may transfer from the cylinders of the engine into the engine oil during operation of the engine under certain conditions, for example when there is a non-stoichiometric fuel to air ratio. Fuel which is present in the engine oil can cause decreased viscosity and degradation of the oil, which may lead to increased component wear in the engine, or a decreased service interval period.

It is an aim of the present invention to address one or more of the disadvantages associated with the prior art.

SUMMARY OF THE INVENTION

Aspects and embodiments of the invention provide a method, an apparatus and a vehicle as claimed in the appended claims According to an aspect of the present invention there is provided a method of mitigating fuel in oil in an internal combustion engine of a hybrid electric vehicle, the method comprising: detecting one or more of a catalyst temperature and a turbine temperature; and when the one or more of the catalyst temperature and the turbine temperature exceeds a first temperature threshold, limiting engine torque below a threshold engine torque required for the operation of an enrichment phase of engine operation, wherein the enrichment phase of engine operation provides a lambda value less than 1. This provides an advantage of restricting phases of engine operation where fuel may be more likely to enter the engine oil.

The method may comprise maintaining limiting engine torque below the threshold engine torque required for the operation of the enrichment phase of engine operation until each of the one or more of the catalyst temperature and the turbine temperature decreases to a second temperature threshold; and when the one or more of the catalyst temperature and the turbine temperature decreases to the second temperature threshold, allowing engine torque to increase above the threshold engine torque required for the operation of an enrichment phase of engine operation.

The first temperature threshold may be a value between 825° C. and 925° C. The first temperature threshold may be 875° C.

The second temperature threshold may be a value between 775° C. and 825° C. The second temperature threshold may be 800° C.

According to an aspect of the present invention there is provided a method of mitigating fuel in oil in an internal combustion engine of a hybrid electric vehicle, the method comprising: detecting a first engine start of a drive cycle when the vehicle speed is greater than zero; detecting a temperature of engine oil in the engine at the first engine start of the drive cycle; determining if the temperature of the engine oil is below an engine oil temperature threshold; and when the temperature of the engine oil is determined to be below the engine oil temperature threshold, inhibiting an engine stop for a first predetermined time period unless the vehicle speed reaches zero. This provides an advantage of maintaining an engine in an on condition for a longer period to encourage the evaporation of fuel from the engine oil, thereby helping to prevent a build-up of fuel in the engine oil.

The first predetermined time period may be a time period between 60 seconds and 120 seconds. The first predetermined time period may be 90 seconds.

The engine oil temperature threshold may be a value selected between 30° C. and 60° C. The engine oil temperature threshold may be 45° C.

A display of the vehicle may indicate, for the period that the engine stop is inhibited, that a user selectable electric vehicle mode is unavailable. This provides an advantage of indicating a variation of operation of the vehicle to the user, such that the user does not assume that there is a fault in the operation of the vehicle.

According to an aspect of the present invention there is provided a method of mitigating fuel in oil in an internal combustion engine of a hybrid electric vehicle, the method comprising: detecting a temperature of engine oil in the engine; determining when the temperature of the engine oil is below an engine oil temperature threshold; and when the temperature of the engine oil is determined to be below the engine oil temperature threshold, inhibiting an engine stop unless the vehicle speed is below a first threshold vehicle speed or braking of the vehicle is effected at a vehicle speed below a second threshold vehicle speed. This provides an advantage of maintaining an engine in an on condition for a longer period to encourage the evaporation of fuel from the engine oil, thereby helping to prevent a build-up of fuel in the engine oil.

The method may comprise: determining when the temperature of the engine oil exceeds the engine oil temperature threshold; and when the temperature of the engine oil is determined to exceed the engine oil temperature threshold, allowing the engine stop.

The method may comprise: when the temperature of the engine oil is determined to be below the engine oil temperature threshold, modifying a requested torque value from a user of the vehicle by applying a torque multiplication value to the requested torque value, and applying the modified requested torque value at the engine when the user requests torque. The torque multiplication value may be 0.5. This provides an advantage of minimising excess fuel being injected during a cold operation phase of the engine, where excess fuel may need to be injected into the cylinder to ensure correct engine operation.

The method may comprise: when the temperature of the engine oil is determined to exceed the engine oil temperature threshold, applying a requested torque value at the engine when the user requests torque.

The first threshold vehicle speed may be a value between 1 and 15 kph. The second threshold vehicle speed may be a value between 15 and 50 kph.

The engine oil temperature threshold may be a value selected between 30° C. and 60° C. The engine oil temperature threshold may be 45° C.

A display of the vehicle may indicate, for the period that the engine stop is inhibited, that a user selectable electric vehicle mode is unavailable. This provides an advantage of indicating a variation of operation of the vehicle to the user, such that the user does not assume that there is a fault in the operation of the vehicle.

According to an aspect of the present invention there is provided a method of mitigating fuel in oil in an internal combustion engine of a hybrid electric vehicle, the method comprising: detecting events in which the engine is on for less than a predetermined engine on duration and a temperature of engine oil in the engine is below a predetermined temperature for the engine on duration; counting the detected events; when the number of detected events counted reaches a threshold count value and the vehicle speed exceeds a threshold vehicle speed value, running the engine for a predetermined warm up duration or until the temperature of the engine oil exceeds a predetermined warm up temperature. This provides an advantage of causing evaporation of fuel from the engine oil following multiple cold start events when excess fuel may have been passed or transported into the engine oil.

The predetermined engine on duration may be between 90 and 300 seconds.

The predetermined temperature for the engine on duration may be between 40° C. and 50° C.

The threshold count value may depend on the detected event durations and the engine oil temperatures during the detected events.

The threshold vehicle speed value may be between 20 kph and 25 kph. The threshold vehicle speed value may be 22 kph.

The method may comprise: when the vehicle speed reduces to zero before the engine has run for the predetermined warm up duration or before the temperature of the engine oil exceeds the predetermined warm up temperature, switching off the engine and resuming running of the engine when the vehicle speed next exceeds the threshold vehicle speed value. This provides an advantage of maintaining some electric only functionality of the vehicle.

The predetermined warm up duration may be between 900 and 1300 seconds. The predetermined warm up duration may be 1100 seconds.

The predetermined warm up temperature may be between 90° C. and 100° C. The predetermined warm up temperature may be 95° C.

The method may comprise: when running the engine following the number of detected events reaching the threshold count value, continuing to apply a load to the engine when a user requested torque is reduced to zero. This provides an advantage of increasing the likelihood of evaporation of fuel from the engine oil.

The torque requested for the engine, when the user requested torque is zero, may be between 70 Nm and 200 Nm.

The method may comprise: when the engine is running, until the end of the predetermined warm up duration or until the temperature of the engine oil exceeds a predetermined warm up temperature, indicating on a display of the vehicle that a user selectable electric vehicle mode is unavailable. This provides an advantage of indicating a variation of operation of the vehicle to the user, such that the user does not assume that there is a fault in the operation of the vehicle.

According to an aspect of the present invention there is provided a method of mitigating fuel in oil in an internal combustion engine of a hybrid electric vehicle, the method comprising: determining an amount of fuel flow into the engine oil during one or more cold start phases of engine operation; determining an amount of fuel flow into the engine oil during one or more enrichment phases of engine operation; determining an amount of fuel evaporated from the engine oil during one or more phases of vehicle operation with the engine on; determining an amount of fuel evaporated from the engine oil during one or more phases of vehicle operation with the engine off; determining a percentage of fuel in the engine oil from the amount of fuel flow into the engine oil and the amount of fuel evaporated from the engine oil; and modifying vehicle operation based on the percentage of fuel in the engine oil exceeding a first fuel in oil threshold or a second fuel in oil threshold. This provides an advantage of providing data for the optimisation of vehicle operation based on the determined fuel in oil value for the engine.

The first fuel in oil threshold may be a value between 5% and 8%. The first fuel in oil threshold may be 7%. The second fuel in oil threshold may be a value between 8% and 15%. The second fuel in oil threshold may be 9%. The second fuel in oil threshold is greater than the first fuel in oil threshold.

The method may comprise: when the percentage of fuel in the engine oil exceeds the first fuel in oil threshold and is less than the second fuel in oil threshold, inhibiting an engine stop unless the vehicle speed is below a first threshold vehicle speed or braking of the vehicle is effected at a vehicle speed below a second threshold vehicle speed. This provides the advantage of maintaining engine operation to increase evaporation of fuel from the engine oil.

The first threshold vehicle speed may be a value between 1 and 15 kph. The second threshold vehicle speed may be a value between 15 and 50 kph.

A display of the vehicle may indicate, for the period that the engine stop is inhibited, that a user selectable electric vehicle mode is unavailable. This provides an advantage of indicating a variation of operation of the vehicle to the user, such that the user does not assume that there is a fault in the operation of the vehicle.

The method may comprise: modifying a requested torque value from a user of the vehicle by applying a torque multiplication value to the requested torque value, and applying the modified requested torque value at the engine when the user requests torque. The torque multiplication value may be 0.5. This provides an advantage of minimising excess fuel being injected during a cold operation phase of the engine, where excess fuel may need to be injected into the cylinder to ensure correct engine operation.

The method may comprise: when the percentage of fuel in the engine oil exceeds the second fuel in oil threshold and the vehicle speed exceeds a threshold vehicle speed value, running the engine. The threshold vehicle speed value may be between 20 kph and 25 kph. The threshold vehicle speed value may be 22 kph.

The method may comprise: when the vehicle speed reduces to zero, switching off the engine and resuming running of the engine when the vehicle speed next exceeds the threshold vehicle speed value.

The method may comprise: when running the engine, continuing to apply a load to the engine when a user requested torque is reduced to zero. This provides an advantage of increasing the likelihood of evaporation of fuel from the engine oil. The torque requested for the engine, when the user requested torque is zero, is between 70 Nm and 200 Nm.

The method may comprise: when the engine is running, indicating on a display of the vehicle that a user selectable electric vehicle mode is unavailable. This provides an advantage of indicating a variation of operation of the vehicle to the user, such that the user does not assume that there is a fault in the operation of the vehicle.

According to an aspect of the present invention there is provided an apparatus for managing fuel in oil in an engine of a hybrid electric vehicle, the apparatus comprising processing means configured to carry out the method of any preceding aspect.

According to an aspect of the present invention there is provided a vehicle comprising an apparatus according to any preceding aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIGS. 9-1, 9-2, and 9-3, show a flow diagram of blocks of a method according to an embodiment of the invention;

DETAILED DESCRIPTION

Examples of the present disclosure relate to a method of mitigating fuel in oil in an internal combustion engine of a hybrid electric vehicle and apparatus for mitigating fuel in oil in an internal combustion engine of a hybrid electric vehicle. The term fuel in oil, in the embodiments described below, relates to fuel dilution in engine oil.

Some examples of the present disclosure relate to a method of mitigating fuel in oil in an internal combustion engine of a hybrid electric vehicle by reducing or preventing fuel flow into the engine oil in a vehicle engine, and apparatus for performing that method.

Some examples of the present disclosure relate to a method of mitigating fuel in oil in an internal combustion engine of a hybrid electric vehicle by increasing fuel flow out of the engine oil in a vehicle engine, and apparatus for performing that method. Fuel flow out of the engine may be by evaporation of the fuel from the engine oil, in particular by the evaporation of the fuel from the engine oil residing in the engine crankcase.

Some examples of the present disclosure relate to a method of mitigating fuel in oil in an internal combustion engine of a hybrid electric vehicle by determining the fuel flow into and out of the engine oil in a vehicle engine, determining the amount of fuel in the engine oil and modifying vehicle operation based on the amount of fuel in the engine oil, and apparatus for performing that method.

The methods described herein are of particular relevance to hybrid electric vehicles as such vehicles can operate, that is be driven, without the engine being on, and the operation of the engine can be instigated by a user demanding acceleration of the vehicle, for example to overtake another vehicle, thereby requiring operation of the engine under potentially high loads and at cold temperatures.

A hybrid electric vehicle comprises both an internal combustion engine and electric propulsion means, such as an electric motor, which may sometimes be called a traction motor. The electric propulsion means may be powered by a battery, which may sometimes be called a traction battery. Such hybrid electric vehicles can be operated with the engine on, or the engine off, or in some circumstances with both the engine on and the electric propulsion means on. When the engine is off, the electric propulsion means may solely operate to move the vehicle. Such a hybrid electric vehicle may be arranged or configured to drive in a mode whereby only electric power is used to cause the vehicle to move. Such a mode may be operable when a vehicle speed is below a certain threshold and/or the battery charge is above a certain threshold. In some vehicles electric only operation can be provided or selected by a user. Such an electric vehicle mode may be called a selectable electric vehicle (SEV) mode.

Non-limiting examples will now be described with reference to the accompanying drawings.

Figure 1:
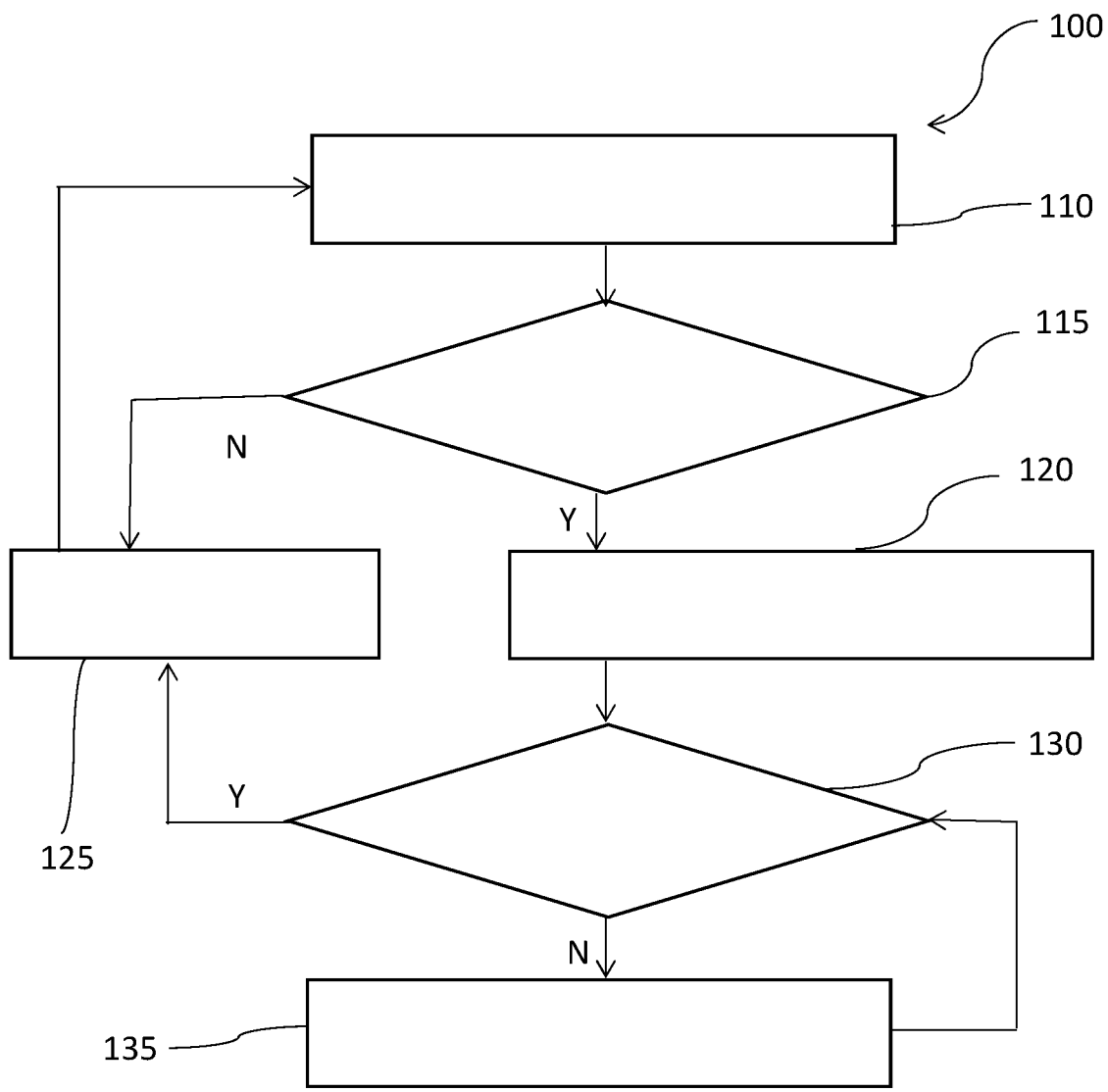
FIG. 1 shows a flow diagram of blocks of a method according to an embodiment of the invention.

A method 100 of mitigating fuel in oil in an internal combustion engine of a hybrid electric vehicle in accordance with an embodiment of the present invention is described herein with reference to the accompanying FIG. 1. An apparatus 10-1 for performing the method 100 for mitigating fuel in oil according to an embodiment of the invention is described herein with reference to the accompanying FIG. 2. A vehicle 600 in accordance with an embodiment of the present invention is described herein with reference to accompanying FIG. 11.

FIG. 1 illustrates a flow chart of the blocks of a method 100 for mitigating fuel in oil in a hybrid electric vehicle. The method 100 is intended to limit torque in an internal combustion engine of a vehicle such that the occurrence of component protection enrichment events can be reduced.

The method 100 of mitigating fuel in oil in an internal combustion engine of a hybrid electric vehicle begins at block 110, where one or more of a catalyst temperature and a turbine temperature is detected.

The catalyst is the active material in a catalytic converter causing chemical reaction with elements of exhaust gases in a vehicle exhaust, and the measure of a catalyst temperature may be directly measured or inferred from a temperature measured in, or at, the catalytic converter. The turbine is a component of a turbocharger, and so a measure of the turbine temperature may be directly measured or inferred from a temperature measured in, or at, the turbocharger.

When the engine is operating, a combustion cycle takes place in the engine. A complete combustion event takes place when all of the fuel that is injected into the cylinders of the engine is burned, such that in the exhaust gas there are no quantities of unburned fuel. The ideal air to fuel ratio for complete combustion is the stoichiometric air to fuel ratio. A ratio of the actual air to fuel ratio exhibited by the engine to the ideal air to fuel ratio is termed the lambda value, and can be measured using a lambda sensor in the vehicle exhaust path.

A lambda value of 1 indicates stoichiometric conditions where the mass of air is exactly the right amount to cause complete combustion, a lambda value less than 1 indicates a rich air to fuel mixture, where there is not enough air to completely burn the fuel, and a lambda value greater than 1 indicates a lean air to fuel mixture where there is more air than is required to completely burn the fuel. When lambda is less than 1 there will be unburnt fuel in the exhaust gases and when lambda is greater than 1 there will be excess oxygen in the exhaust gases.

At block 115, the one or more of a catalyst temperature and a turbine temperature are compared to a first temperature threshold.

At block 120, when the one or more of the catalyst temperature and the turbine temperature exceeds the first temperature threshold, engine torque is limited below a threshold engine torque required for the operation of an enrichment phase of engine operation. The enrichment phase of engine operation provides, or requires, a lambda value less than 1.

At block 125, when the one or more of the catalyst temperature and the turbine temperature do not exceed the first temperature threshold, normal vehicle operation is continued. Normal vehicle operation is an operation of the vehicle where there are no restrictions, such that, for example, the vehicle may operate in selectable electric vehicle mode.

In an alternative embodiment, when both a catalyst temperature and a turbine temperature are detected the limitation of engine torque may be initiated when one of the catalyst temperature or turbine temperature exceeds the first temperature threshold.

The enrichment phase of engine operation is a phase where the engine may be operated at a high speed and high load that requires a target lambda value to be less than 1.

The value of engine speed which constitutes a high speed engine operation may depend on the engine to which the method is applied, and may, for example, be an engine speed above 4500 revolutions per minute. The value of a load which constitutes a high load may depend on the engine to which the method is applied, and may, for example, be a load greater than 60% of maximum engine torque output.

Such an enrichment phase may define component protection enrichment, where components of the engine can be protected from possible detrimental effects of running the engine at high speed and high loads, which may be especially prevalent in a hybrid electric vehicle, where the engine may be started whilst high loads are being demanded by the driver of the vehicle, such as in an overtaking manoeuvre when the vehicle is already moving under electric only power, at or towards the limit of electric only power delivery.

During an enrichment phase, additional fuel is injected into the engine to reduce a temperature of one or more cylinders of the engine. Since the combustion of the fuel is not stoichiometric due to the target lambda value being less than 1, there is excess fuel entering the cylinders which is then unburned. This excess unburned fuel vaporises on the cylinder walls and cools them which decreases the temperature of the cylinder walls and the exhaust gas temperature. Some of this excess fuel may be transported into the engine oil during operation of the engine in the enrichment phase. In particular, during the motion of the piston in the cylinder, excess fuel can flow between a piston and the cylinder wall into the engine oil in the crank case of the engine.

Therefore, by limiting engine torque below a threshold engine torque required for the operation of an enrichment phase of engine operation, excess fuel is not injected into the engine, to pass into the cylinder, and therefore transportation of excess fuel into the engine oil can be reduced or prevented.

The first temperature threshold for the catalyst or the turbine may be a value between 825° C. and 925° C. For example, the first temperature threshold may be 875° C. or 900° C. When the temperature of the catalyst or the turbine, or the temperature of both the catalyst and turbine, reaches or exceeds the first temperature threshold, available torque for the engine is limited. Therefore the maximum torque that can be applied by the engine is not an amount of driver demanded torque, when that driver demanded torque is above the threshold engine torque required for the operation of an enrichment phase of engine operation. Since the engine torque is limited, the engine cannot be operated beyond a load that would require the operation of the engine in an enrichment phase.

At block 130, when the engine torque is limited below a threshold for the enrichment phase of engine operation, the one or more of a catalyst temperature and a turbine temperature are compared to a second temperature threshold.

At block 135, engine torque is maintained below the threshold engine torque required for the operation of the enrichment phase of engine operation until each of the one or more of the catalyst temperature and the turbine temperature decreases to a second temperature threshold.

In an alternative embodiment, the engine torque may be maintained below the threshold engine torque required for operation of the enrichment phase of engine operation until one of the detected catalyst temperature and the turbine temperature decreases to a second temperature threshold.

The second temperature threshold may be a temperature of a value between 775° C. and 825° C. For example, the second temperature threshold may be 800° C.

At block 130, when the one or more of the catalyst temperature and the turbine temperature decreases to the second temperature threshold, engine torque is allowed to increase above the threshold engine torque required for the operation of an enrichment phase of engine operation. That is, the limitation imposed when the one or more of the catalyst temperature and the turbine temperature exceeded the first temperature threshold is removed when the temperature of the catalyst or the turbine, or the temperature of both the catalyst and turbine, decreases to, or below, the second temperature threshold. When each of the one or more of the catalyst temperature and the turbine temperature decreases to a second temperature threshold the vehicle therefore returns to normal operation at block 125.

The first temperature threshold is higher than the second temperature threshold, and may have a buffer in between, for example a buffer of 75° C., to prevent quick switching between an engine operation mode that prevents the enrichment phase of engine operation and an engine operation mode that allows the enrichment phase of engine operation, in order to avoid undesirable engine operation fluctuations. For example, the first temperature threshold may be 875° C. and the second temperature threshold may be 800° C., giving a buffer of 75° C. When the temperature of the catalyst or the turbine exceeds the first threshold of 875° C. the enrichment phase of engine operation is prevented or inhibited. Only when the temperature of the catalyst and/or turbine falls below the second threshold of 800° C. will the enrichment phase of engine operation be available or allowed.

Whilst this method may lead to a limitation in available engine torque, to avoid excess fuel being introduced into the engine oil from enrichment phase operation, there is no limitation in operating the vehicle in electric only mode, that is, with the engine switched off, as whilst the engine is switched off there is no possibility of the engine running in an enrichment phase of operation.

Figure 2:
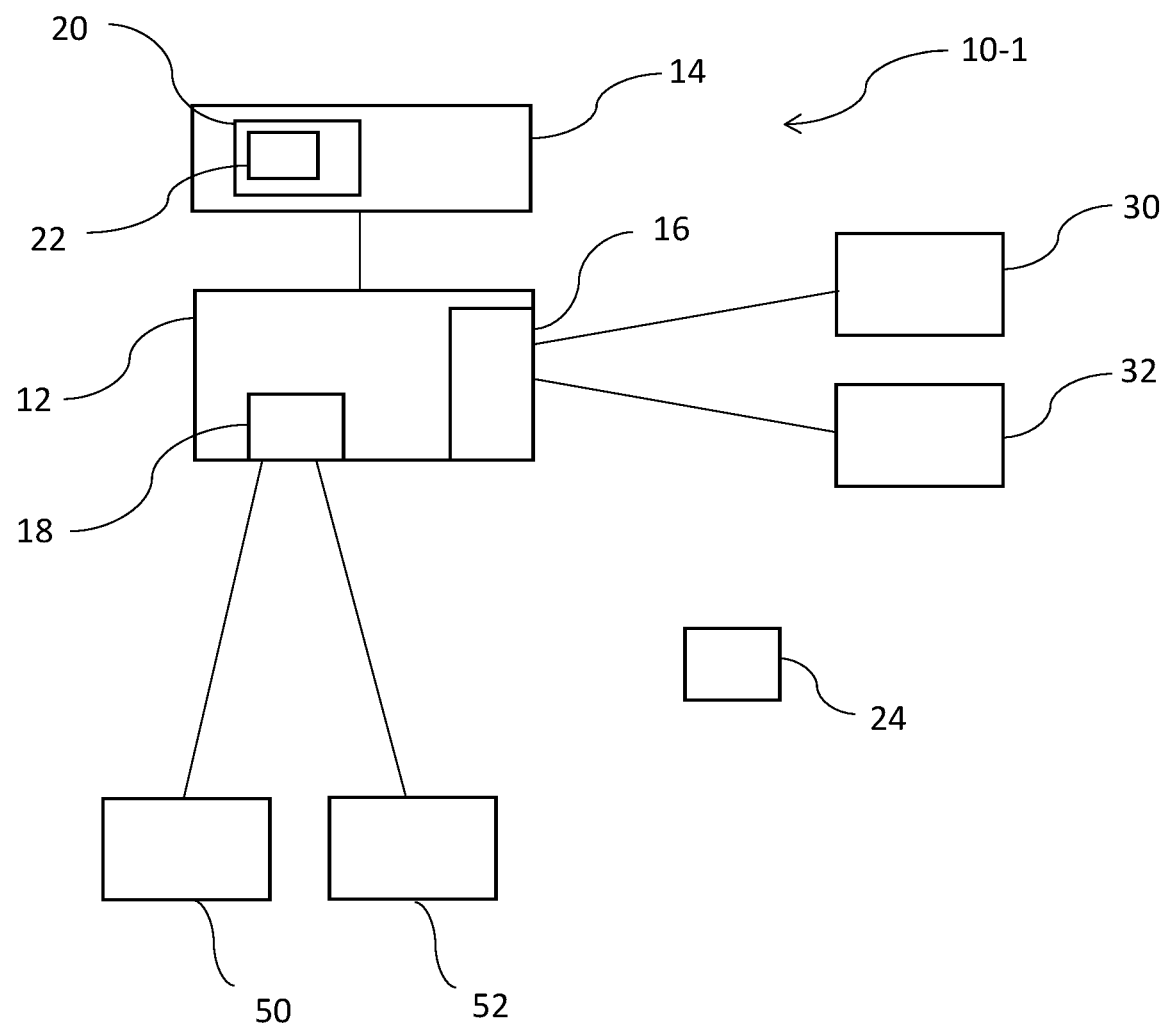
FIG. 2 illustrates a schematic diagram of an apparatus for mitigating fuel in oil according to the embodiment of the invention shown in FIG. 1.

FIG. 2 illustrates an apparatus 10-1 for performing the method 100 for mitigating fuel in oil according to an embodiment of the invention.

The apparatus 10-1 comprises processing means 12, which may be in the form of, or comprise, a processor or processing circuitry, which is operable to carry out the blocks of the method as previously described, and may form part of one or more systems comprised in a vehicle 600. The processing means 12 may be implemented in hardware alone, have certain aspects in software including firmware alone or can be a combination of hardware and software (including firmware). The processing means 12 may be implemented using instructions that enable hardware functionality, for example, by using executable instructions of a computer program 20 in a general-purpose or special-purpose processing means 12 that may be stored on a computer readable storage medium (disk, memory etc.) to be executed by such a processing means 12.

The processing means 12 is configured to read from and write to storage means 14. The processing means 12 may also comprise an output interface 16 via which data and/or commands are output by the processing means 12. The processing means 12 may also comprise an input interface 18 via which data and/or commands are input to the processing means 12. For example, data relating to the temperature of the catalyst and data relating to the temperature of the turbine, may be received at the input interface 18.

The processing means 12 may be coupled to storage means 14, which may be in the form of a volatile or a non-volatile memory, which is arranged or configured to store the operations of the method for execution by the processing means 12, and also to store data relating to the operation of the method 100.

The storage means 14 stores a computer program 20 comprising computer program instructions 22 (computer program code) for carrying out the above described method, and may output information or control one or more vehicle functions when loaded into the processing means 12. The computer program instructions 22, of the computer program 20, provide the logic and routines that enables the apparatus 10-1 to perform the methods illustrated in FIG. 1 and/or described herein. The processing means 12, by reading the storage means 14, is able to load and execute the computer program 20.

The apparatus 10-1 therefore comprises: at least one processing means 12; and at least one storage means 14 including computer program code, the at least one storage means 14 and the computer program code configured to, with the at least one processing means 12, cause the processing means 12 to: detect one or more of a catalyst temperature and a turbine temperature; and when the one or more of the catalyst temperature and the turbine temperature exceeds a first temperature threshold, limit engine torque below a threshold engine torque required for the operation of an enrichment phase of engine operation, wherein the enrichment phase of engine operation provides a lambda value less than 1.

The apparatus 10-1 may be operably coupled to a catalyst temperature sensor 50 and a turbine temperature sensor 52, such that measurements of a catalyst temperature and/or a turbine temperature can be received and processed by the processor 12 to determine if the first temperature threshold has been exceeded. In this manner, the processor 12 may determine the catalyst temperature and/or the turbine temperature.

The computer program 20 may arrive at the apparatus 10 via any suitable delivery mechanism 24. The delivery mechanism 24 may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program 20. The delivery mechanism 24 may be a signal configured to reliably transfer the computer program 20.

In some embodiments, the apparatus 10-1 may further comprise one or more user interface, which may be in the form of display means 30, for example a visual user display or an instrument cluster of the vehicle 600, which may provide a visual indication relating to the status of the engine with regards to a fuel in oil value, and/or be in the form of an auditory interface 32 where a user of the vehicle 600 may be alerted by audible warnings relating to the status of the engine with regards to a fuel in oil value. The user interface may provide, for example, a visual or audible indication of the availability of a selectable electric vehicle mode.

Figure 3:
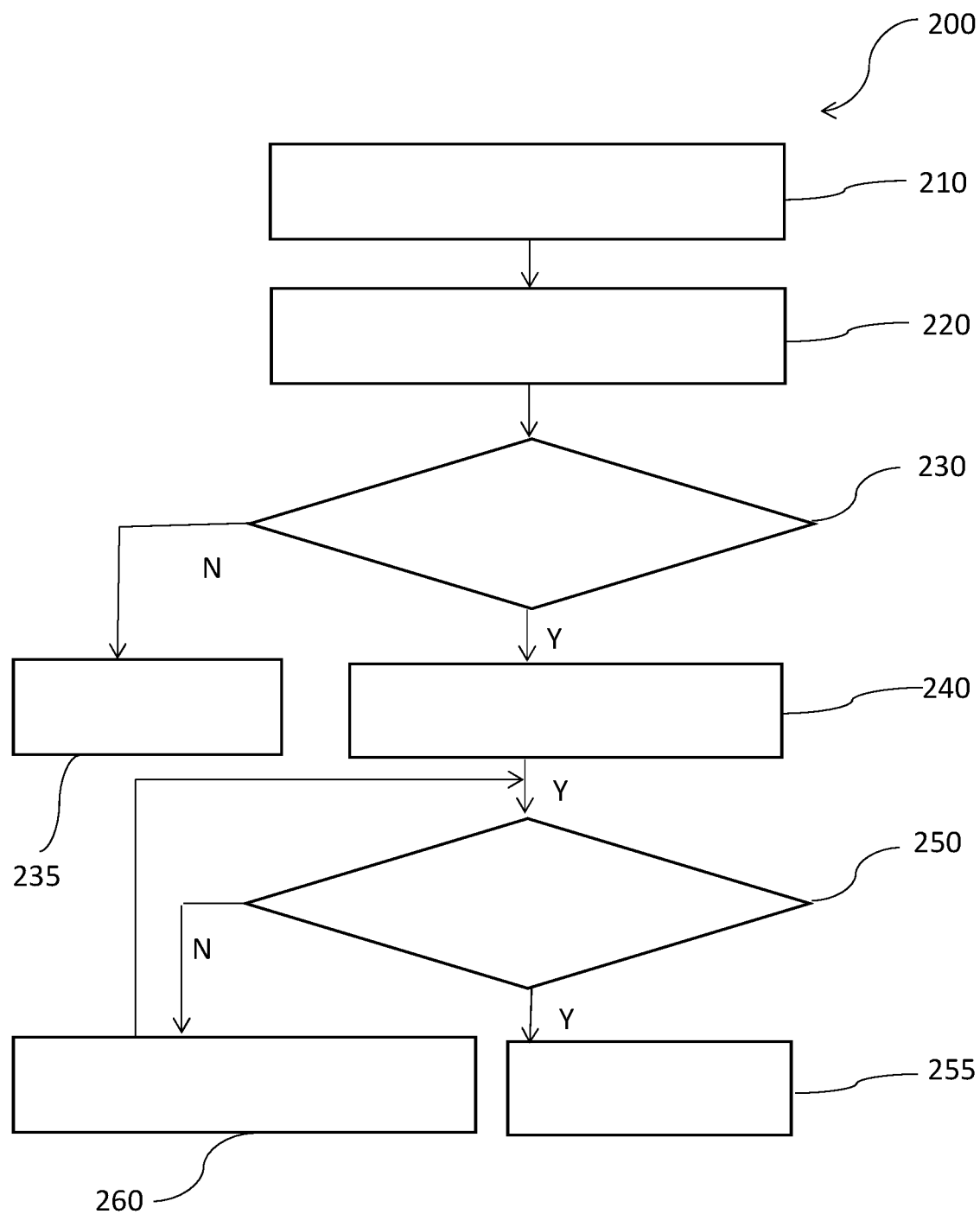
FIG. 3 shows a flow diagram of blocks of a method according to an embodiment of the invention.

A method 200 of mitigating fuel in oil in an internal combustion engine of a hybrid electric vehicle in accordance with an embodiment of the present invention is described herein with reference to the accompanying FIG. 3. An apparatus 10-2 for mitigating fuel in oil according to an embodiment of the invention is described herein with reference to the accompanying FIG. 4. A vehicle 600 in accordance with an embodiment of the present invention is described herein with reference to accompanying FIG. 11.

FIG. 3 illustrates a flow chart of the blocks of a method 200 for mitigating fuel in oil in a hybrid electric vehicle. In particular the method 200 relates to mitigating fuel in oil during a start phase of an internal combustion engine of a hybrid electric vehicle.

The method 200 of mitigating fuel in oil in an internal combustion engine of a hybrid electric vehicle begins at block 210, where a first engine start of a drive cycle is detected when the vehicle speed is greater than zero, that is, when the vehicle is not stationary. A drive cycle may comprise a single journey, or a plurality of journeys where the time between journeys is negligible, or at least insufficient for the engine oil to reach ambient temperature.

At block 220 a temperature of engine oil in the engine is detected at the first engine start of the drive cycle. The engine may be first started at any point on a journey of the vehicle, the vehicle having undertaken travel up to that point by only using an electric vehicle mode. The electric vehicle mode may be a mode where electric power is used to drive one or more traction motors.

At block 230 it is determined if the temperature of the engine oil at the first engine start in the drive cycle is below an engine oil temperature threshold, that engine oil temperature threshold being the engine oil temperature threshold at the first engine start of the drive cycle. The engine oil temperature threshold is a predetermined value below which fuel enrichment may be high, that is, excess fuel above what is required for lambda to equal 1 is injected into the engine to ensure correct operation during a start phase, or cold start phase, of the engine. Fuel enrichment may lead to excess fuel which is unburned during combustion in the cylinder entering the engine oil leading to a potential change in engine oil viscosity and potential engine oil degradation which may lead to increased engine wear and/or shorter service intervals for the vehicle.

The engine oil temperature threshold at the first engine start of the drive cycle may be a value between 30° C. and 50° C. For example, the engine oil temperature threshold at the first engine start of the drive cycle may be 45° C.

If the temperature of the engine oil is not determined to be below the engine oil temperature threshold, then normal operation of the vehicle continues at block 235.

At block 240, when the temperature of the engine oil is determined to be below the engine oil temperature threshold, an engine stop is inhibited for a first predetermined time period unless the vehicle speed reaches zero, or until the vehicle speed reaches zero.

At block 250 it is determined if the vehicle speed is zero during the predetermined time period. If the vehicle speed is zero, then the inhibition on the engine stop is removed at block 255, and the engine is stopped. If the vehicle speed is not zero, then the inhibition on the engine stop continues at block 260 until the end of first predetermined time period, or until the vehicle speed reaches zero.

The first predetermined time period may be a time period between 60 seconds and 120 seconds. For example, the first predetermined time period may be 90 seconds. Therefore, once the engine is started for the first time in a drive cycle it remains on for the predetermined time period.

However, in some embodiments, if the vehicle comes to a stop, that is reaches approximately 0 kph, within the predetermined time period, then the engine will stop.

In this method 200, the torque output of the engine is not manipulated and the operation of the engine is therefore not modified, such that an amount of demanded torque can be supplied by the engine, thus not affecting the driving experience in this regard for the user.

However, the selectable electric vehicle mode is suspended, or unavailable, for the predetermined time period, or for the period that the engine stop is inhibited. A user interface may display the restriction in the use of selectable electric vehicle mode, or unavailability of the selectable electric vehicle mode, in some visible way for the driver of the vehicle. For example, the restriction in the use of selectable electric vehicle mode can be indicated by greying out a selectable electric vehicle icon, or by not illuminating a selectable electric vehicle icon, or by displaying a selectable electric vehicle icon in a different colour, for example red. In this manner the vehicle can identify that selectable electric vehicle mode is suspended, or unavailable, to the user so that the user does not think there is a vehicle fault.

In this method 200, there is an increased likelihood of keeping the engine on longer following the first start of the engine on a drive cycle, or at least a decreased likelihood of operating the engine for only a short duration where the engine oil temperature may remain below a temperature threshold where excess fueling of the engine is required. By retaining the operation of the engine for a predetermined time period it is ensured that a temperature will be reached which allows evaporation of fuel from the engine oil.

Figure 4:
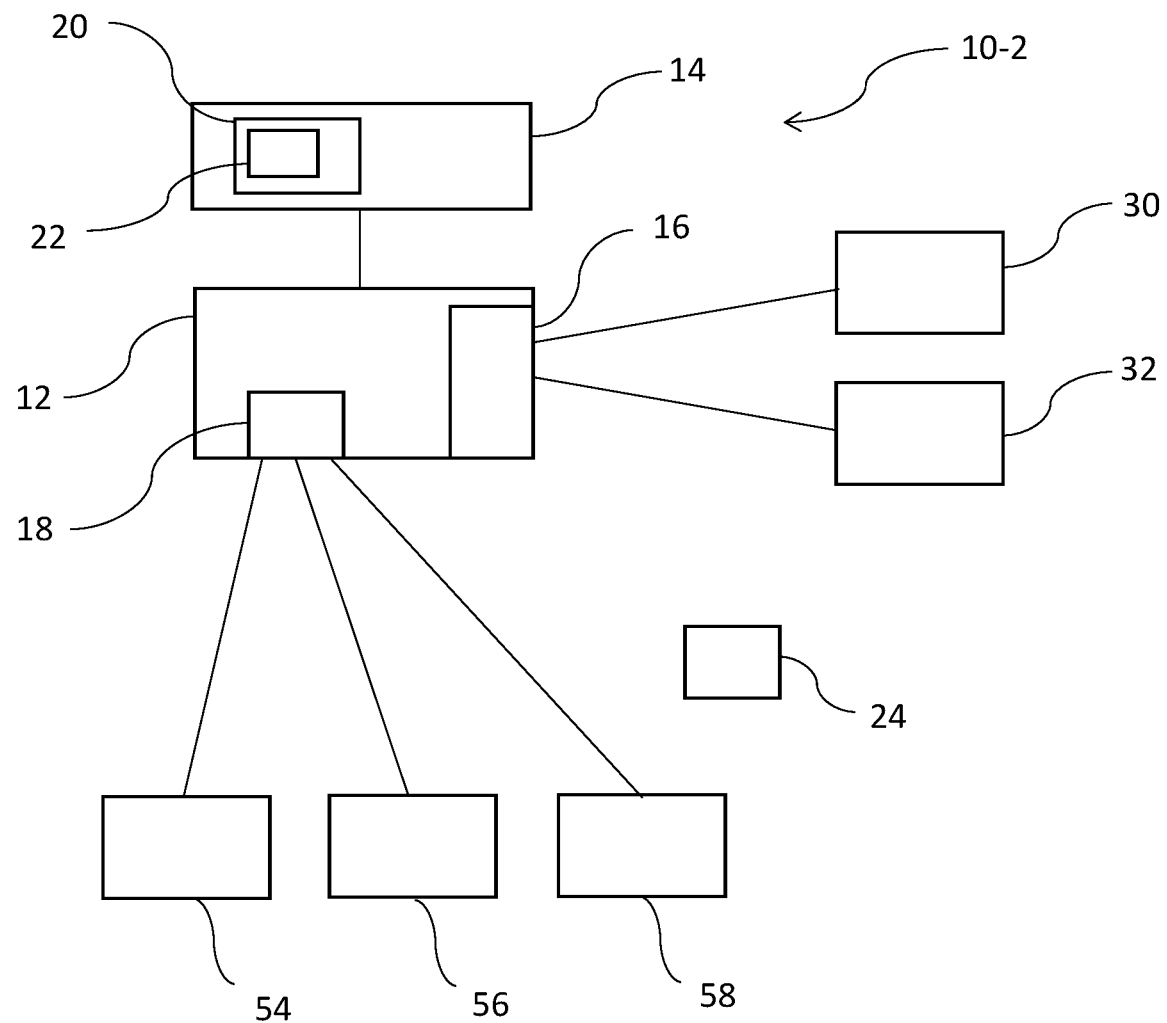
FIG. 4 illustrates a schematic diagram of an apparatus for mitigating fuel in oil according to the embodiment of the invention shown in FIG. 3.

FIG. 4 illustrates an apparatus 10-2 for performing the method 200 for mitigating fuel in oil according to an embodiment of the invention.

The apparatus 10-2 comprises components as previously described in relation to apparatus 10-1, where like reference numerals in the figures indicate like components.

In apparatus 10-2 data relating to an engine start parameter, for example from an engine control unit, the temperature of the engine oil in the engine, and the vehicle speed, may be received at the input interface 18.

The apparatus 10-2 may be operably coupled to an engine oil temperature sensor 54 and an engine control unit 56, such that measurements of engine oil temperature and an indication of an engine start can be received and processed by the processor 12 to determine whether an engine stop should be inhibited. The apparatus 10-2 may be operably coupled to a vehicle speed sensor 58 to measure the vehicle speed, where a signal from the vehicle speed sensor 58 may be received and processed by the processor 12 to determine whether an engine stop should be inhibited.

The processing means 12 may be coupled to storage means 14, which may be in the form of a volatile or a non-volatile memory, which is arranged or configured to store the operations of the method for execution by the processing means 12, and also to store data relating to the operation of the method 200.

The storage means 14 stores a computer program 20 comprising computer program instructions 22 (computer program code) for carrying out the above described method, and may output information or control one or more vehicle functions when loaded into the processing means 12. The computer program instructions 22, of the computer program 20, provide the logic and routines that enables the apparatus 10-2 to perform the methods illustrated in FIG. 3 and/or described herein. The processing means 12, by reading the storage means 14, is able to load and execute the computer program 20.

The apparatus 10-2 therefore comprises: at least one processing means 12; and at least one storage means 14 including computer program code, the at least one storage means 14 and the computer program code configured to, with the at least one processing means 12, cause the processing means 12 to: detect a first engine start of a drive cycle when the vehicle speed is greater than zero; detect a temperature of engine oil in the engine at the first engine start of the drive cycle; determine if the temperature of the engine oil is below an engine oil temperature threshold; and when the temperature of the engine oil is determined to be below the engine oil temperature threshold, inhibit an engine stop for a first predetermined time period unless the vehicle speed reaches zero.

In some embodiments, the apparatus 10-2 may further comprise one or more user interface, which may be in the form of display means 30, for example a visual user display or an instrument cluster of the vehicle 600, which may provide a visual indication relating to the status of the engine with regards to a fuel in oil value, and/or be in the form of an auditory interface 32 where a user of the vehicle 600 may be alerted by audible warnings relating to the status of the engine with regards to a fuel in oil value. The user interface may provide a visual indication of the availability of a selectable electric vehicle mode.

Figure 5:
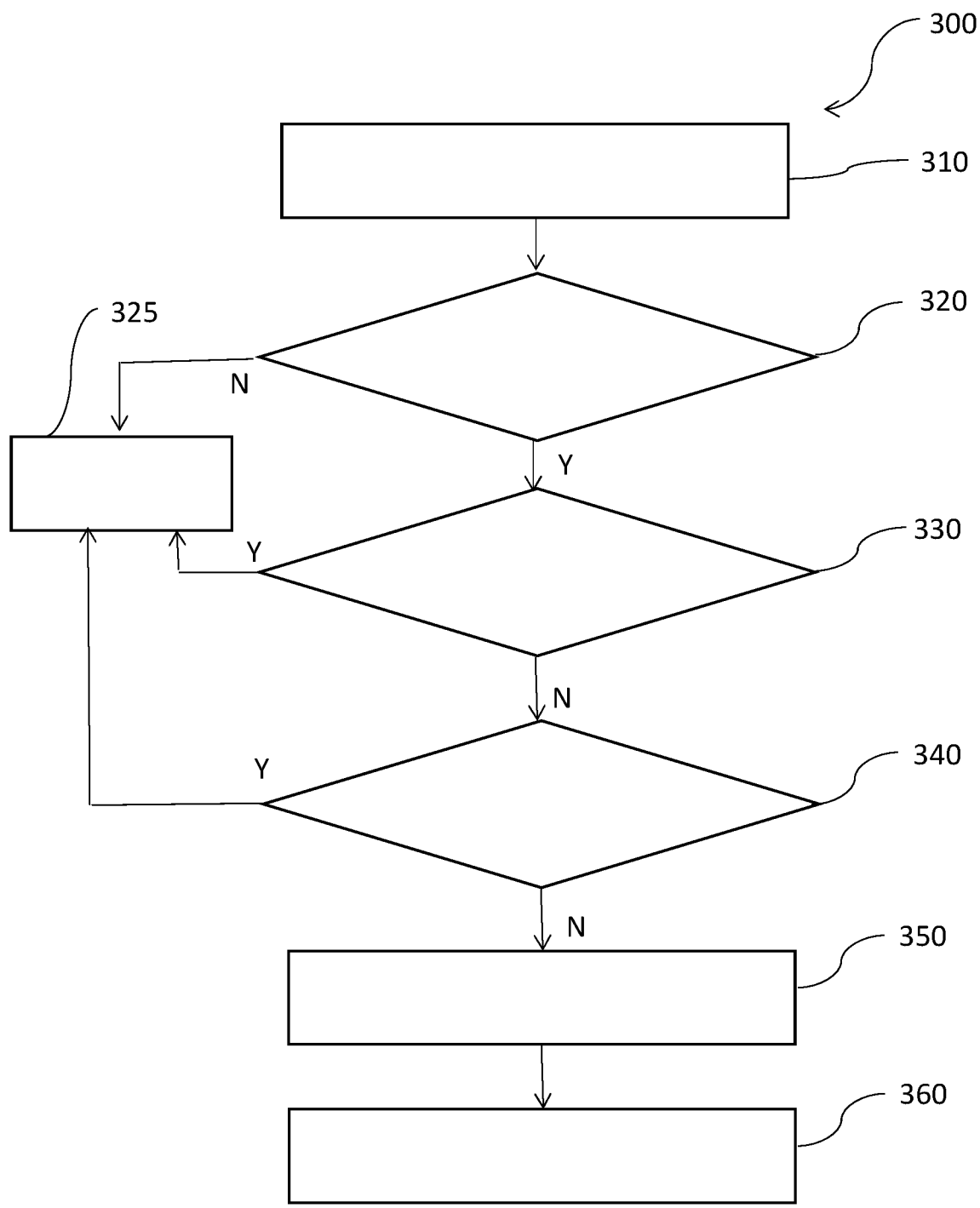
FIG. 5 shows a flow diagram of blocks of a method according to an embodiment of the invention.

A method 300 of mitigating fuel in oil in an internal combustion engine of a hybrid electric vehicle in accordance with an embodiment of the present invention is described herein with reference to the accompanying FIG. 5. An apparatus 10-3 for mitigating fuel in oil according to an embodiment of the invention is described herein with reference to the accompanying FIG. 6. A vehicle 600 in accordance with an embodiment of the present invention is described herein with reference to accompanying FIG. 11.

FIG. 5 illustrates a flow chart of the blocks of a method 300 for mitigating fuel in oil in a hybrid electric vehicle. In particular the method 300 relates to mitigating fuel in oil during operation of an internal combustion engine of a hybrid electric vehicle.

The method 300 of mitigating fuel in oil in an internal combustion engine of a hybrid electric vehicle begins at block 310, where, when an engine is on, a temperature of engine oil in the engine is detected.

At block 320, the temperature of the engine oil is compared to an engine oil temperature threshold to determine if the temperature of the engine oil is below an engine oil temperature threshold.

The engine oil temperature threshold during engine operation may be a value selected between 30° C. and 60° C. For example, the engine oil temperature threshold during engine operation may be 45° C.

At block 325, if the temperature of the engine oil is determined to be above the engine oil temperature threshold, then normal vehicle operation can continue, that is, operation of the vehicle can continue without restriction.

When the temperature of the engine oil is determined to be below the engine oil temperature threshold at block 320, an engine stop is inhibited at block 350 unless the vehicle speed is below a first threshold vehicle speed, determined at block 330, or braking of the vehicle is effected at a vehicle speed below a second threshold vehicle speed, determined at block 340.

If the vehicle speed is below a first threshold vehicle speed, as determined at block 330, or braking of the vehicle is effected at a vehicle speed below a second threshold vehicle speed, as determined at block 340, then normal vehicle operation can continue at block 325, that is, operation of the vehicle without restriction.

Therefore, when the engine is on, or running, the engine is maintained in an on, or running, condition, which allows for the temperature of the engine oil to rise in order to lead to evaporation of fuel from the engine oil. Elements of electric vehicle operation are however maintained in several scenarios, the first being allowing the engine to switch off when the vehicle speed reduces to an idle or creep speed, and the second being allowing the engine to switch off if the vehicle is driving in slow to medium speed conditions and the vehicle is suddenly braked.

The first threshold vehicle speed may be a value for an idle or creep speed of the vehicle and may be, for example, between 1 and 15 kph. The second threshold vehicle speed is a value between 15 and 50 kph, equating to a slow to medium vehicle speed, above the idle or creep speed. In some embodiments, the second threshold speed may be a variable dependent on the braking force applied, such that the engine may be allowed to switch off at higher speeds when greater braking force is applied to the vehicle.

Thus this method allows for the engine to switch off under certain conditions, even if the temperature of the engine oil is below an engine oil temperature threshold, for example 45° C.

When the temperature of the engine oil is determined to exceed the engine oil temperature threshold, the engine is allowed to stop. Therefore at temperatures above the engine oil temperature threshold, the vehicle operates in a normal manner without any restrictions.

When the temperature of the engine oil is determined to be below the engine oil temperature threshold, and an engine stop is prohibited, a requested torque value from a user of the vehicle may be modified at block 360, by applying a torque multiplication value to the requested torque value, and applying the modified requested torque value at the engine when the user requests torque.

Therefore when operating in a low temperature range, below the engine oil temperature threshold, there is reduced engine load, due to the applied torque multiplication value, leading to a reduced requirement to inject fuel into the engine and hence a reduced fuel flow into the engine oil. When less fuel is injected into the engine less fuel can be introduced into the engine oil.

The torque multiplication value may be any value below 1, which will provide, to some degree reduced fuel flow into the engine oil. The lower the torque multiplication value, the greater effect will be experienced by the driver of the vehicle. A lower multiplication value will have a greater beneficial effect on reducing fuel flow into the engine oil, but also provides the greatest impact on the driving experience for the driver of the vehicle. A higher multiplication value will have a lesser beneficial effect on reducing fuel flow into the engine oil, but also provides the least impact on the driving experience for the driver of the vehicle. A reasonable compromise between benefit in terms of reducing fuel flow into the engine oil and impact on the driving experience for the driver of the vehicle is to provide a multiplication value of 0.5.

When the temperature of the engine oil is determined to exceed the engine oil temperature threshold, a requested torque value is applied at the engine when the user requests torque. Since, the vehicle operates in a normal manner without any restrictions when the temperature of the engine oil is determined to exceed the engine oil temperature threshold, there is no torque multiplier applied to the requested torque.

Therefore, the selectable electric vehicle mode may be suspended, or unavailable, whilst the temperature of the engine oil is below the engine oil temperature threshold during engine operation. A user interface may display the restriction in the use of selectable electric vehicle mode, or unavailability of the selectable electric vehicle mode, in some visible way for the driver of the vehicle. For example, the restriction in the use of selectable electric vehicle mode can be indicated by greying out a selectable electric vehicle icon, or by not illuminating a selectable electric vehicle icon, or by displaying a selectable electric vehicle icon in a different colour, for example red. In this manner the vehicle can identify that selectable electric vehicle mode is suspended, or unavailable, to the user so that the user does not think there is a vehicle fault.

Figure 6:
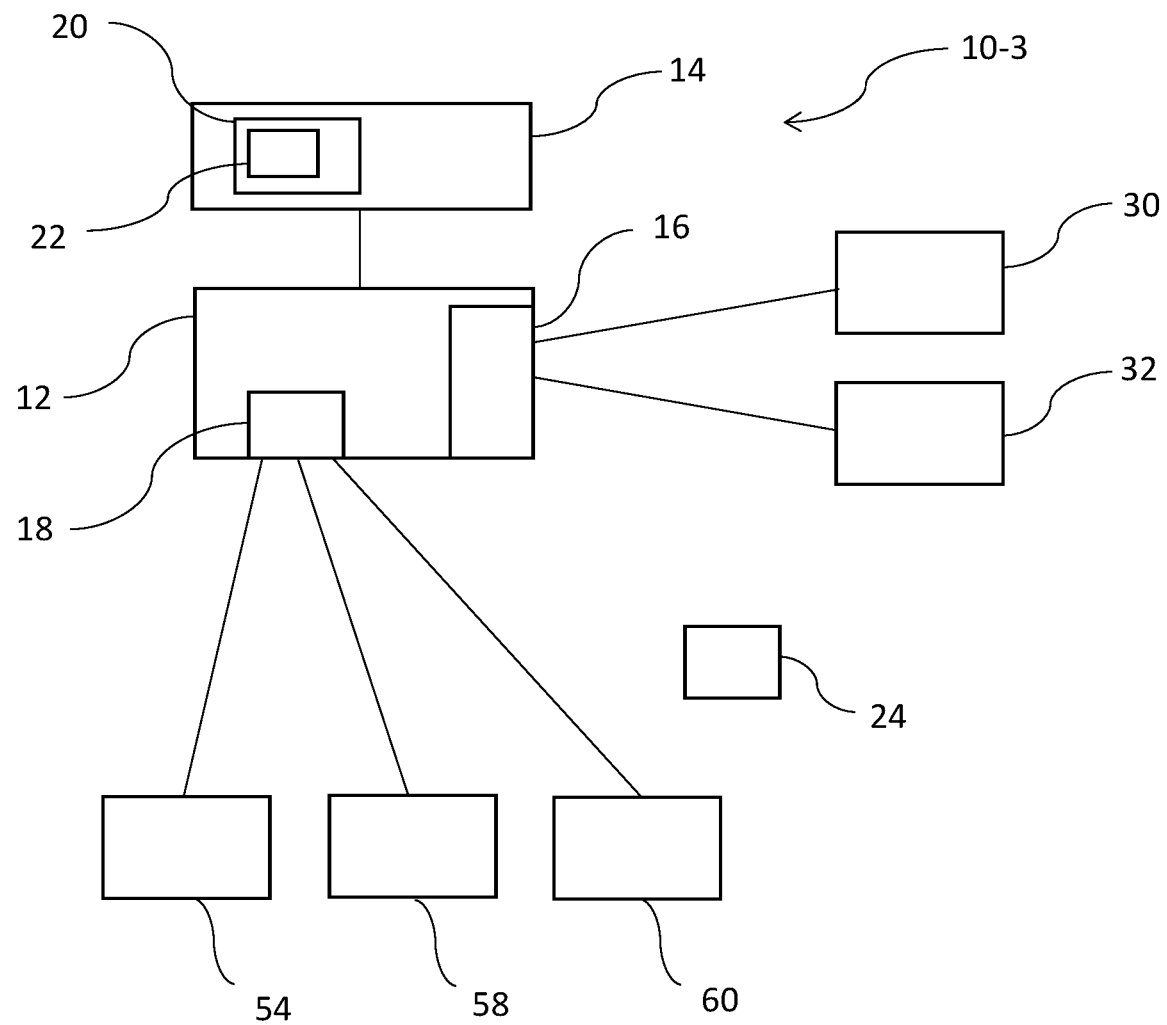
FIG. 6 illustrates a schematic diagram of an apparatus for mitigating fuel in oil according to the embodiment of the invention shown in FIG. 5.

FIG. 6 illustrates an apparatus 10-3 for performing the method 300 for mitigating fuel in oil according to an embodiment of the invention.

The apparatus 10-3 comprises components as previously described in relation to apparatus 10-1 and apparatus 10-2, where like reference numerals in the figures indicate like components.

In apparatus 10-3 data relating to the temperature of the engine oil in the engine, data relating to a vehicle speed, and data relating to a braking function of the vehicle 600 may be received at the input interface 18.

The apparatus 10-3 may be operably coupled to an engine oil temperature sensor 54, a vehicle speed sensor 58, and brake sensor 60 such that measurements of engine oil temperature, vehicle speed and braking function can be received and processed by the processor 12 to determine whether an engine stop should be inhibited.

The processing means 12 may be coupled to storage means 14, which may be in the form of a volatile or a non-volatile memory, which is arranged or configured to store the operations of the method for execution by the processing means 12, and also to store data relating to the operation of the method 300.

The storage means 14 stores a computer program 20 comprising computer program instructions 22 (computer program code) for carrying out the above described method, and may output information or control one or more vehicle functions when loaded into the processing means 12. The computer program instructions 22, of the computer program 20, provide the logic and routines that enables the apparatus 10-3 to perform the methods illustrated in FIG. 5 and/or described herein. The processing means 12, by reading the storage means 14, is able to load and execute the computer program 20.

The apparatus 10-3 therefore comprises: at least one processing means 12; and at least one storage means 14 including computer program code, the at least one storage means 14 and the computer program code configured to, with the at least one processing means 12, cause the processing means 12 to: detect a temperature of engine oil in the engine; determine when the temperature of the engine oil is below an engine oil temperature threshold; and when the temperature of the engine oil is determined to be below the engine oil temperature threshold, inhibit an engine stop unless the vehicle speed is below a first threshold vehicle speed or braking of the vehicle is effected at a vehicle speed below a second threshold vehicle speed.

In some embodiments, the apparatus 10-3 may further comprise one or more user interface, which may be in the form of display means 30, for example a visual user display or an instrument cluster of the vehicle 600, which may provide a visual indication relating to the status of the engine with regards to a fuel in oil value, and/or be in the form of an auditory interface 32 where a user of the vehicle 600 may be alerted by audible warnings relating to the status of the engine with regards to a fuel in oil value. The user interface may provide a visual indication of the availability of a selectable electric vehicle mode.

Figure 7:
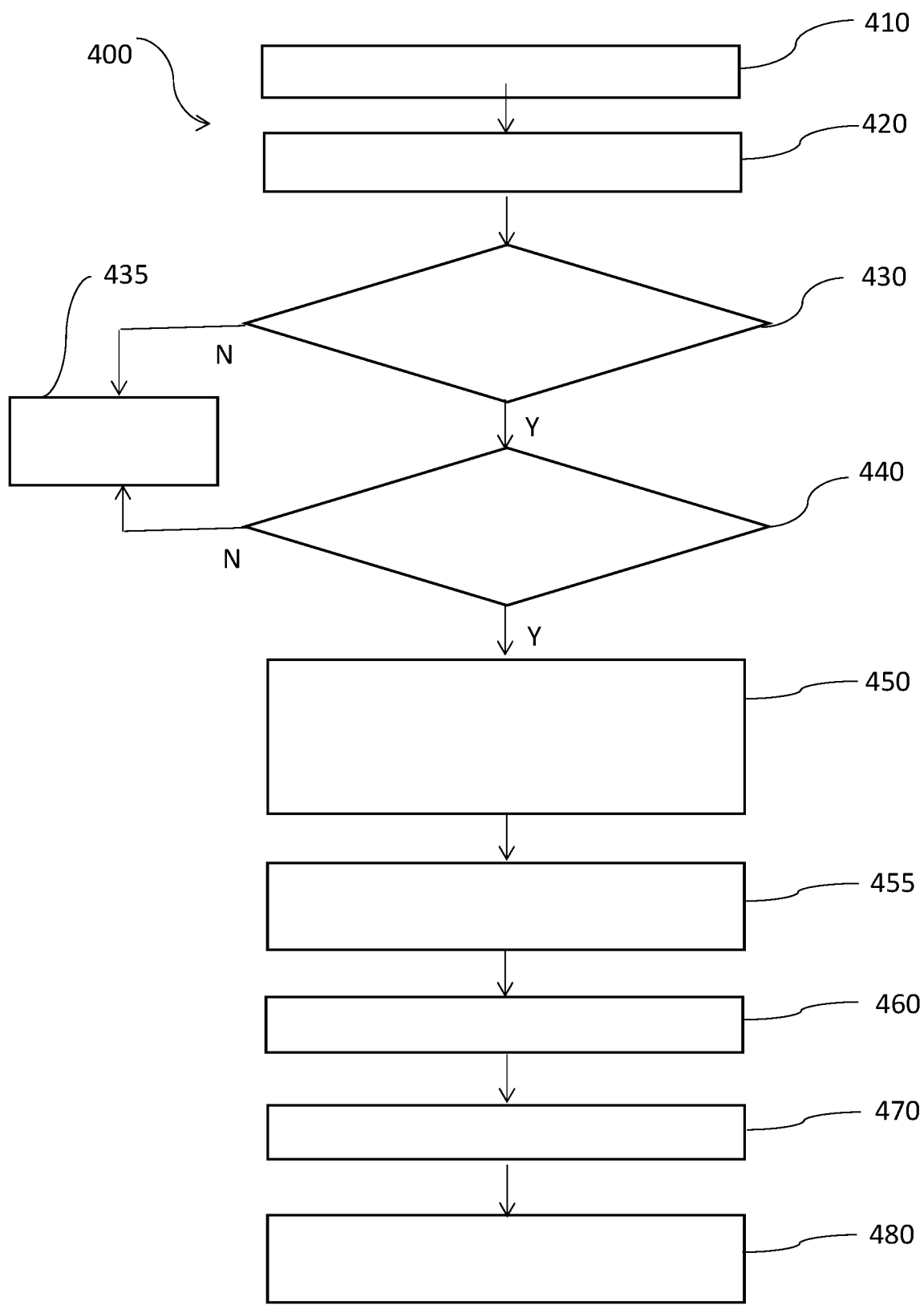
FIG. 7 shows a flow diagram of blocks of a method according to an embodiment of the invention.

A method 400 of mitigating fuel in oil in an internal combustion engine of a hybrid electric vehicle in accordance with an embodiment of the present invention is described herein with reference to the accompanying FIG. 7. An apparatus 10-4 for mitigating fuel in oil according to an embodiment of the invention is described herein with reference to the accompanying FIG. 8. A vehicle 600 in accordance with an embodiment of the present invention is described herein with reference to accompanying FIG. 11.

FIG. 7 illustrates a flow chart of the blocks of a method 400 for mitigating fuel in oil in a hybrid electric vehicle. In particular the method 400 relates to mitigating fuel in oil during operation of an internal combustion engine of a hybrid electric vehicle. The method 400 of mitigating fuel in oil in an internal combustion engine of a hybrid electric vehicle begins at block 410, where events are detected in which the engine is on for less than a predetermined engine on duration and a temperature of engine oil in the engine is below a predetermined temperature for the engine on duration. These detected events, which represent cold, short duration, engine runs, may be called cold events. The predetermined engine on duration may be selected from a duration between 90 and 300 seconds. The predetermined temperature for the engine on duration may be between 40° C. and 50° C.

At block 420 the detected events are counted. At block 430 the number of detected events counted is compared to a threshold count value, to determine if the number of detected events counted reaches, or exceeds, a threshold count value.

If the number of detected events counted is less than the threshold count value, then normal vehicle operation can continue at block 435, that is, operation of the vehicle can continue without restriction.

If the number of detected events counted is equal to or greater than the threshold count value then, at block 440, the vehicle speed is compared to a threshold vehicle speed value to see if the vehicle speed exceeds the threshold vehicle speed. If the vehicle speed does not exceed the threshold vehicle speed, then normal vehicle operation is maintained at block 435, that is, operation of the vehicle can continue without restriction.

At block 450, when the number of detected events counted reaches a threshold count value and the vehicle speed exceeds a threshold vehicle speed value, the engine may be run for a predetermined warm up duration or until the temperature of the engine oil exceeds a predetermined warm up temperature.

The threshold count value may depend on the detected event durations and the engine oil temperatures during those detected events. In some embodiments, the threshold count value may be between 30 and 40. For example, a threshold count value may be 35, meaning that 35 events may be detected before a threshold count value is reached, following the detection of which, the engine may be switched on.

The switch on of the engine may also be dependent on a vehicle speed exceeding a threshold vehicle speed value. Such a threshold vehicle speed value may be selected from a value in the range of 15 to 25 kilometers per hour (kph), more preferably between 20 and 25 kph. For example the threshold vehicle speed may be 20 kph or 22 kph. By setting a threshold vehicle speed, for switching the engine on after a threshold count value has been reached, it is more likely that the vehicle is to be driven for a substantial period of time, as opposed to merely being briefly moved, when the benefit of starting the engine to warm up the engine oil, and ultimately cause evaporation of fuel from the engine oil, can be achieved.

The threshold count value can vary depending on the detected event durations and the engine oil temperatures during those detected events. A particular threshold count value, for example 35, may be applied when, for each counted event, the engine oil temperature does not exceed 45° C. and the duration of the engine on event is between 60 seconds and 90 seconds. However, if one or more detected events reaches a higher temperature or lasts for a longer duration, the threshold count value may be increased, for example to 36, such that the forced engine on condition may occur after more detected events. Conversely, if one or more detected events only reaches a temperature significantly lower than 45° C., say 30° C., or lasts for a shorter duration, say 30 seconds, then the threshold count value may be decreased, for example to 34. Therefore, a greater number of shorter colder events which can lead to more fuel entering the oil due to excess fuel being injected at start up and less fuel evaporation from the engine oil, require that the above described prevention measures are activated sooner to maintain the quality of the engine oil and prevent a shortening of a service interval of the vehicle where the engine oil will be changed.

The predetermined warm up duration may be between 900 and 1300 seconds, for example 1100 seconds. The predetermined warm up temperature may be between 90° C. and 100° C., for example 95° C. Therefore, once a forced engine start is initiated by the number of detected events reaching the threshold count value, the engine will stay on for such a predetermined warm up duration or until such a predetermined warm up temperature is reached before allowing the engine to switch off. Once the forced engine start is initiated and the engine has run for the predetermined warm up duration or until the predetermined warm up temperature is reached, the detected event counter is reset to zero.

At block 460, when the vehicle speed reduces to zero before the engine has run for the predetermined warm up duration or before the temperature of the engine oil exceeds the predetermined warm up temperature, the engine may be switched off at block 470. The engine will then switch back on, at block 480, to resume running of the engine when the vehicle speed next exceeds the threshold vehicle speed value. Therefore, once a forced engine start is initiated by the number of detected events reaching the threshold count value, the engine will stay on for such a predetermined warm up duration or until such a predetermined warm up temperature is reached before allowing the engine to switch off, unless the vehicle speed reduces to zero. If the vehicle speed reduces to zero, then the engine may switch off, however, it then resumes running when the vehicle speed exceeds the threshold vehicle speed value again. The engine will continue to run for the remainder of the predetermined warm up duration or until the engine oil exceeds the predetermined warm up temperature.

In an alternative embodiment, if the vehicle speed reaches zero before the end of the predetermined warm up duration or before the engine oil exceeds the predetermined warm up temperature, then when the vehicle speed exceeds the threshold vehicle speed value again, the engine will be run for the whole of the predetermined warm up duration or until the predetermined warm up temperature is reached before allowing the engine to switch off, unless the vehicle speed reduces to zero again before those parameters are satisfied.

Optionally, at block 455, when running the engine following the number of detected events reaching the threshold count value, a load may be continued to be applied to the engine when a user requested torque is reduced to zero. The torque requested for the engine, when the user requested torque reduces to zero following the number of detected events reaching the threshold count value, may be between a minimum torque value and a maximum torque value. The minimum torque value may be 70 Nm and the maximum torque value may be 200 Nm. Such applied force positive torque, applied when the driver reduces the driver requested torque to zero, means that the engine is not switched off, nor is fuel cut in order to not produce any torque. Instead a load is continued to be applied to the engine in a window of torque values. The minimum torque value, for example 70 Nm, maintains a load during tip out. The maximum torque value, for example 200 Nm, avoids high loads that may instigate fuel enrichment phases, such as exhibited during component protection enrichment, which may introduce more fuel into the engine oil.

In an alternative embodiment the torque requested for the engine, following the number of detected events reaching the threshold count value, is between the minimum torque value and the maximum torque value when the user requested torque falls below the minimum torque value. For example the torque requested for the engine is between 70 Nm and 200 Nm when the user requested torque falls below 70 Nm.

When the engine is running, until the end of the predetermined warm up duration or until the temperature of the engine oil exceeds a predetermined warm up temperature, a display of the vehicle may indicate that a user selectable electric vehicle mode is unavailable.

However, the selectable electric vehicle mode is suspended, or unavailable, for the predetermined warm up duration, or until the temperature of the engine oil exceeds a predetermined warm up temperature. A user interface may display the restriction in the use of selectable electric vehicle mode, or unavailability of the selectable electric vehicle mode, in some visible way for the driver of the vehicle. For example, the restriction in the use of selectable electric vehicle mode can be indicated by greying out a selectable electric vehicle icon, or by not illuminating a selectable electric vehicle icon, or by displaying a selectable electric vehicle icon in a different colour, for example red. In this manner the vehicle can identify that selectable electric vehicle mode is suspended, or unavailable, to the user so that the user does not think there is a vehicle fault.

Figure 8:
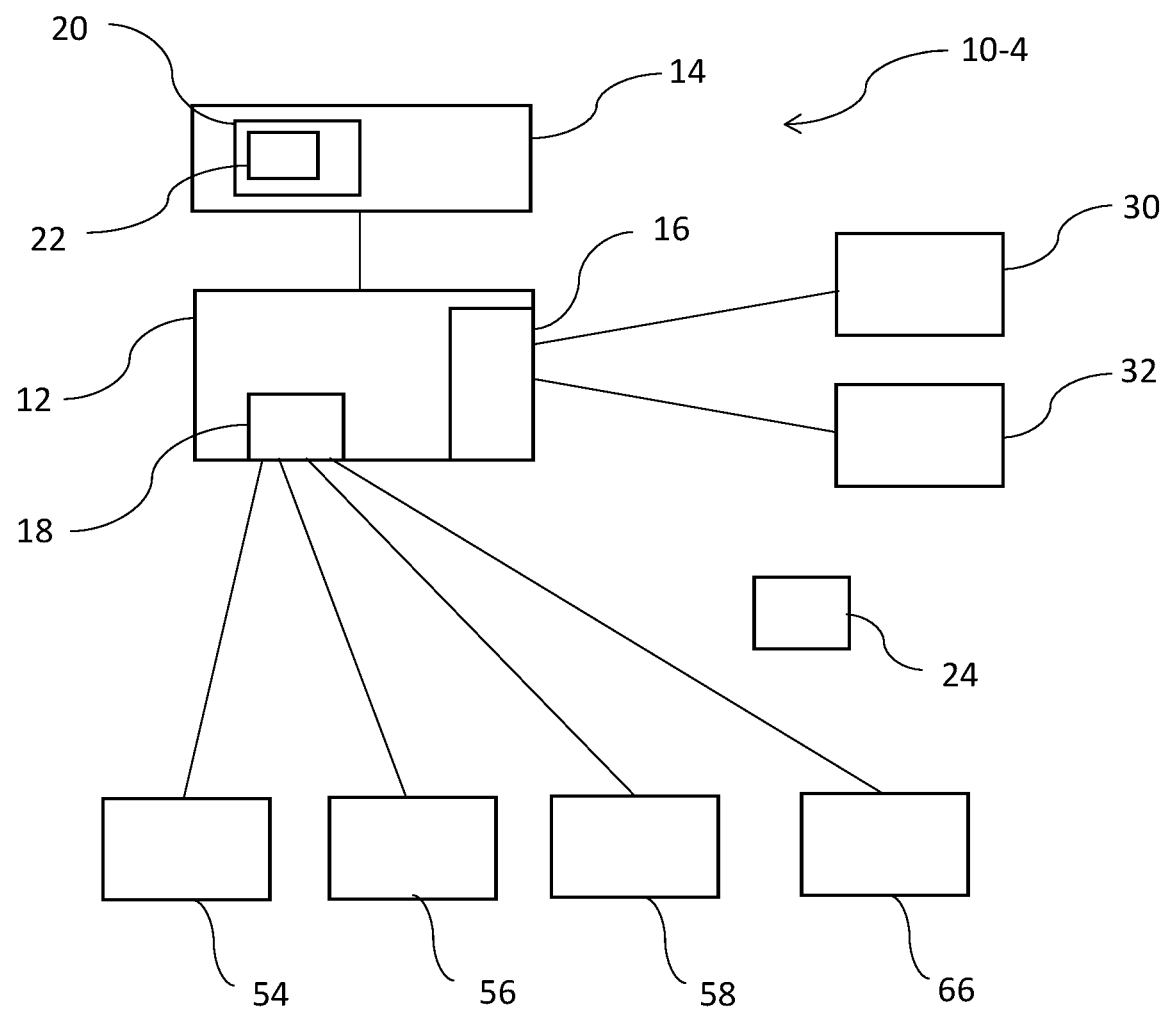
FIG. 8 illustrates a schematic diagram of an apparatus for mitigating fuel in oil according to the embodiment of the invention shown in FIG. 7.

FIG. 8 illustrates an apparatus 10-4 for performing the method 400 for mitigating fuel in oil according to an embodiment of the invention. The apparatus 10-4 comprises components as previously described in relation to apparatus 10-1, 10-2, and 10-3, where like reference numerals in the figures indicate like components. In apparatus 10-4 data relating to an engine start parameter, for example from an engine control unit, and the temperature of the engine oil in the engine, may be received at the input interface 18.

The apparatus 10-4 may be operably coupled to an engine oil temperature sensor 54, an engine control unit 56, a vehicle speed sensor 58, and a user torque request means 66, such as an accelerator 66 of the vehicle 600, such that measurements of engine oil temperature, an indication of an engine being started where the engine is then on for less than a predetermined engine on duration and where a temperature of the engine oil in the engine is below a predetermined temperature for the engine on duration, a vehicle speed, and an indication of an amount of user torque demand, can be received and processed by the processor 12 to determine whether an engine start should be initiated for the engine to run for a predetermined warm up duration or until the temperature of the engine oil exceeds a predetermined warm up temperature.

The processing means 12 may be coupled to storage means 14, which may be in the form of a volatile or a non-volatile memory, which is arranged or configured to store the operations of the method for execution by the processing means 12, and also to store data relating to the operation of the method 400.

The storage means 14 stores a computer program 20 comprising computer program instructions 22 (computer program code) for carrying out the above described method, and may output information or control one or more vehicle functions when loaded into the processing means 12. The computer program instructions 22, of the computer program 20, provide the logic and routines that enables the apparatus 10-4 to perform the methods illustrated in FIG. 7 and/or described herein. The processing means 12, by reading the storage means 14, is able to load and execute the computer program 20.

The apparatus 10-4 therefore comprises: at least one processing means 12; and at least one storage means 14 including computer program code, the at least one storage means 14 and the computer program code configured to, with the at least one processing means 12, cause the processing means 12 to: detect events in which the engine is on for less than a predetermined engine on duration and a temperature of engine oil in the engine is below a predetermined temperature for the engine on duration; count the detected events; when the number of detected events counted reaches a threshold count value and the vehicle speed exceeds a threshold vehicle speed value, run the engine for a predetermined warm up duration or until the temperature of the engine oil exceeds a predetermined warm up temperature.

In some embodiments, the apparatus 10-4 may further comprise one or more user interface, which may be in the form of display means 30, for example a visual user display or an instrument cluster of the vehicle 600, which may provide a visual indication relating to the status of the engine with regards to a fuel in oil value, and/or be in the form of an auditory interface 32 where a user of the vehicle 600 may be alerted by audible warnings relating to the status of the engine with regards to a fuel in oil value. The user interface may provide a visual indication of the availability of a selectable electric vehicle mode.

Figures 1, 9:
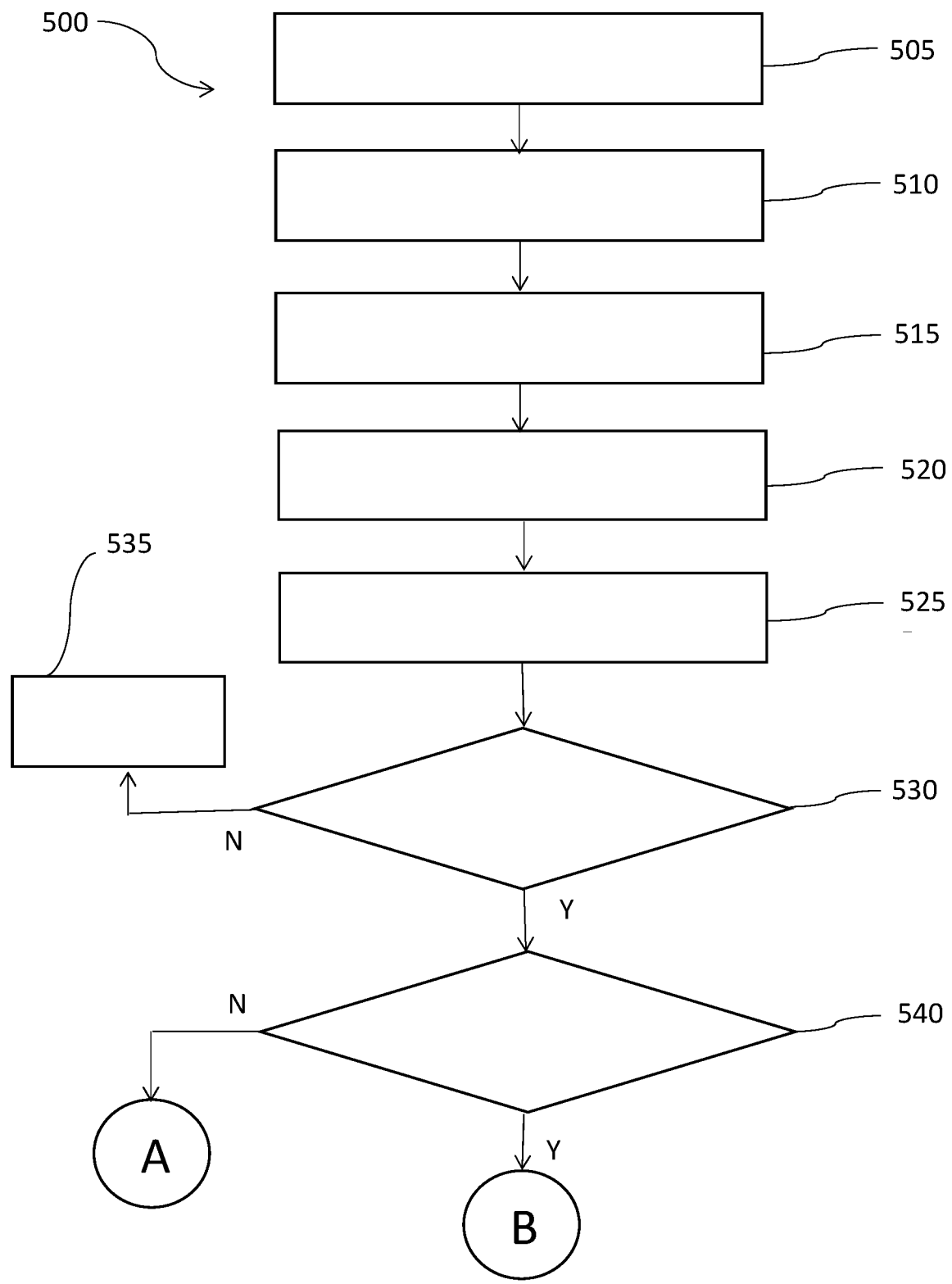
Figures 2, 9:
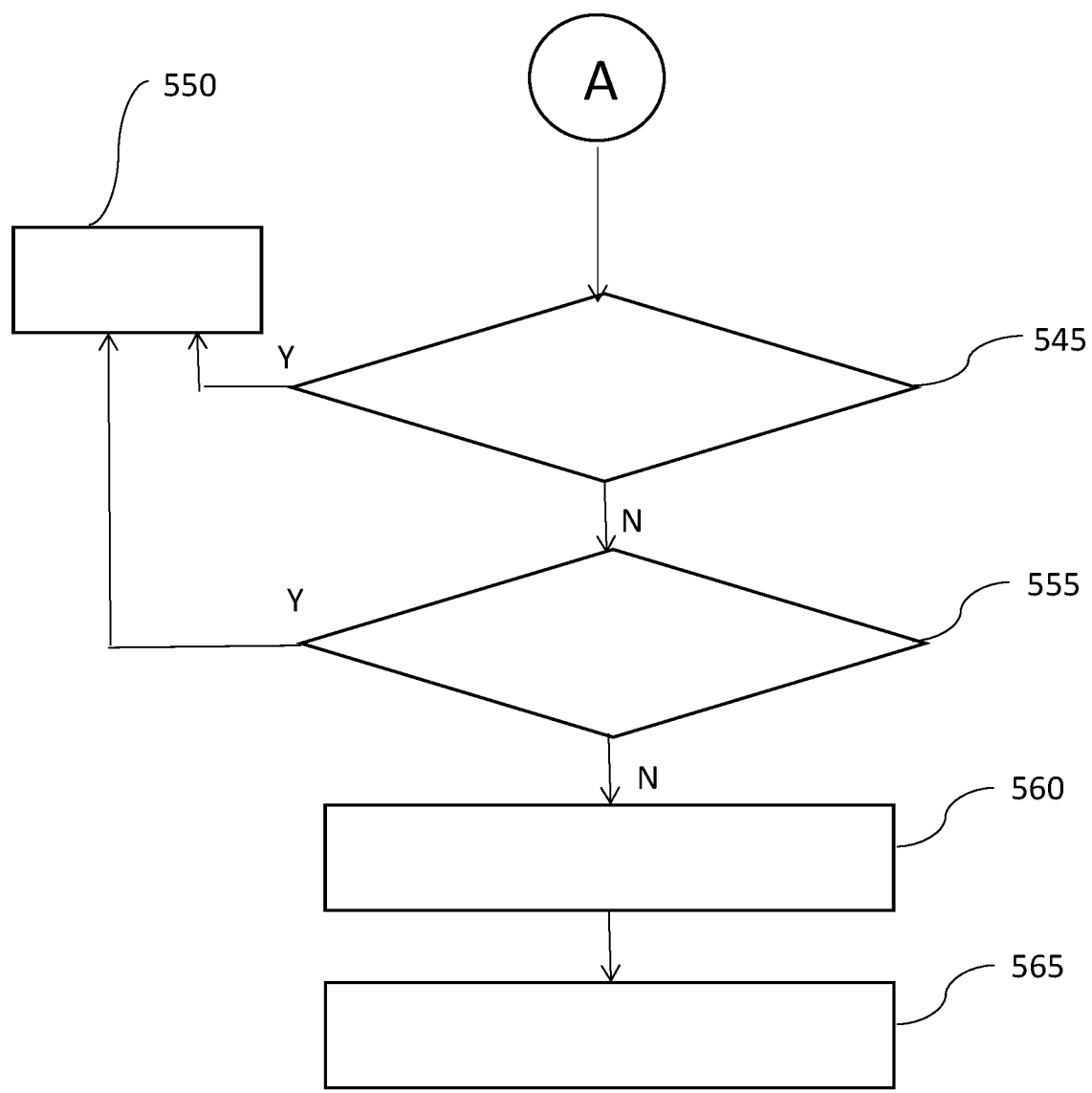
Figures 3, 9:
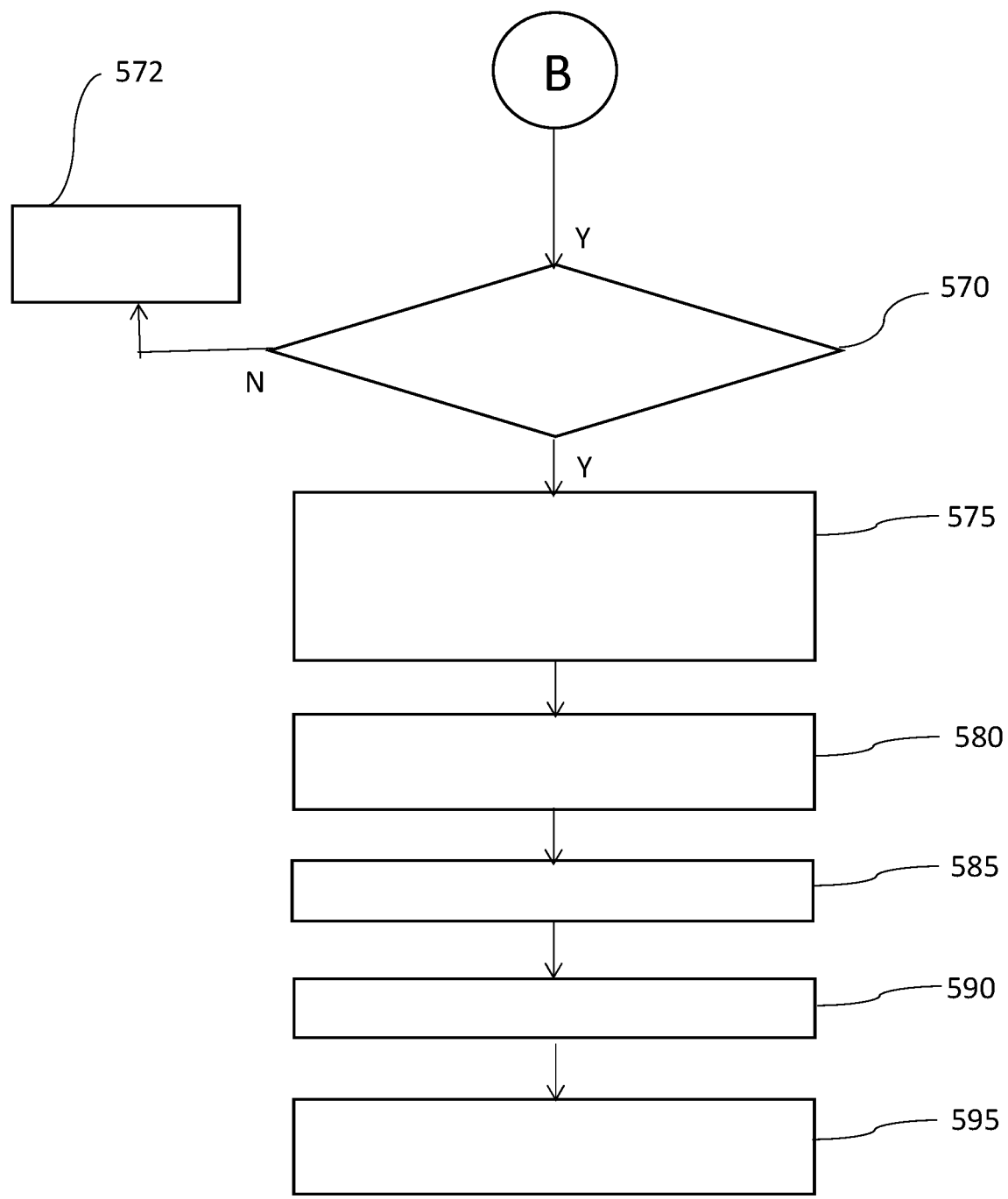

A method 500 of mitigating fuel in oil in an internal combustion engine of a hybrid electric vehicle in accordance with an embodiment of the present invention is described herein with reference to the accompanying FIGS. 9-1, 9-2, and 9-3, where FIG. 9-2 and FIG. 9-3 are continuations of FIG. 9-1. An apparatus 10-5 for managing fuel in oil according to an embodiment of the invention is described herein with reference to the accompanying FIG. 10. A vehicle 600 in accordance with an embodiment of the present invention is described herein with reference to accompanying FIG. 11.

FIGS. 9-1 to 9-3 illustrate or show a flow chart of the blocks of a method 500 for managing fuel in oil in a hybrid electric vehicle 600. A hybrid electric vehicle 600 comprises both an internal combustion engine and electric propulsion means, such as an electric motor, which may sometimes be called a traction motor. The electric propulsion means may be powered by a battery, which may sometimes be called a traction battery. Such hybrid electric vehicles can be operated with the engine on, or the engine off, or in some circumstances with both the engine on and the electric motor on. When the engine is off, the electric propulsion means may solely operate to move the vehicle 600. Such a hybrid electric vehicle 600 may be arranged or configured to drive in a mode whereby only electric power is used to cause the vehicle 600 to move. Such a mode may be operable when a vehicle speed is below a certain threshold and/or the battery charge is above a certain threshold. In some vehicles electric only operation can be provided or selected by a user. Such an electric vehicle mode may be considered as a selective, or selectable electric vehicle mode.

The method 500 of mitigating fuel in oil in an internal combustion engine of a hybrid electric vehicle 600 begins at block 505, where an amount of fuel flow into the engine oil during one or more cold start phases of engine operation is determined.

A cold start phase is an engine phase extending for a period of time from when the engine has been started until it reaches a normal operating temperature. The normal operating temperature is predefined for a particular engine. Such a phase of engine operation may start with the engine at ambient temperature, but not necessarily so. The engine may begin such a phase at a temperature between ambient temperature and the normal operating temperature. Such a period of time will vary depending on the starting temperature of the engine and ambient temperature, as well as other factors relating to engine efficiency. In hybrid electric vehicles operation of the engine can be intermittent during a journey, in other words, the engine may switch on and off depending on a driver torque demand and/or dependent on certain operating factors, such as the speed of the vehicle 600.

The normal operating temperature of an engine is often defined by the engine oil temperature which most commonly has a normal operating temperature in the region of 80° C. to 100° C. Higher engine oil temperature leads to higher oil oxidation, meaning that the engine oil will degrade more quickly requiring more frequent engine oil changes. Most vehicle engines have a standard operating temperature of 90° C., that is, a normal operating temperature for the engine oil of 90° C.

The fuel flow into the engine oil at a cold start phase is calculated by deducting a fuel quantity detected in the vehicle exhaust from an injected fuel quantity. That is, the net quantity of fuel entering the oil is estimated to be the missing quantity of injected fuel that has not been detected in the exhaust.

A combustion cycle takes place in the engine, and a complete combustion event takes place when all of the fuel is burned, such that in the exhaust gas there are no quantities of unburned fuel. The ideal air to fuel ratio for complete combustion is the stoichiometric air to fuel ratio. A ratio of the actual air to fuel ratio exhibited by the engine to the ideal air to fuel ratio is termed the lambda value, and is measured using a lambda sensor in the vehicle exhaust path. A lambda value of 1 indicates stoichiometric conditions where the mass of air is exactly the right amount to cause complete combustion, a lambda value less than 1 indicates a rich air to fuel mixture, where there is not enough air to completely burn the fuel, and a lambda value greater than 1 indicates a lean air to fuel mixture where there is more air than is required to completely burn the fuel. When lambda is less than 1 there will be unburnt fuel in the exhaust gases and when lambda is greater than 1 there will be excess oxygen in the exhaust gases.

The quantity of injected fuel may be known from the operation of the fuel injection system, which injects the desired amount of fuel into a pre-combustion chamber or a combustion chamber of the engine.

During a cold start phase, a greater amount of fuel is required to be injected than is required to be injected when the engine is at a normal operating temperature, since, during the cold start phase, some of the injected fuel contacts cold engine components and cannot then be combusted meaning that engine operation is sub-optimal. The target lambda value may therefore be set to be less than 1 during the one or more cold start phases of engine operation, to provide excess fuel to the engine. For example the target lambda value for the one or more cold start phases of engine operation may be in the range of 0.5 to 1. The target lambda value may depend on the operating temperature of the engine, and a lower value will be required at lower temperatures, though often such a low target lambda value will only be required for a short period, for example up to 5 seconds from starting of the engine, after which the target lambda value will increase towards 1.

The quantity of fuel that has been combusted is determined from measurements by the lambda sensor which measures the amount of oxygen in the exhaust gas. A voltage output of the lambda sensor relates to a detected amount of oxygen and can indicate whether, and how much, fuel is unburned.

The difference between the excess fuel injected and the amount of fuel that has been combusted can then be used to determine the amount of fuel that is assumed to have entered the engine oil. That is, the amount of fuel flow into the engine oil during the one or more cold start phases of engine operation is determined from a difference between the excess fuel provided to the engine due to the target lambda value being less than 1 and an amount of fuel that has been combusted which is measured using a lambda sensor in an exhaust of the engine.

In the one or more cold start phases of engine operation, a proportion of fuel which is required to be injected into the engine, to start the engine, and in some instances operate the engine for a period of time following start of the engine, may therefore enter or flow into the engine oil. This may occur as fuel may impinge on the cylinder walls of the engine and be dragged into the engine oil during operation of the engine.

Various parameters of, or relating to, the engine may affect the amount or proportion of fuel that may enter into the engine oil. For example, the proportion of fuel which enters into the engine oil in the cold start phase of engine operation may be dependent upon the temperature of the engine oil, wherein more fuel may enter into the engine oil in the cold start phase of engine operation when the temperature of the engine oil is low compared to when the temperature of the engine oil is high.

Other parameters relating to the engine may affect the amount or proportion of fuel that may enter or flow into the engine oil in the cold start phase of engine operation, and these may include one or more of: a temperature of engine coolant in the cold start phase of engine operation; the ambient air pressure in the cold start phase of engine operation; and a total distance the vehicle 600 has travelled.

The determination of the total distance the vehicle 300 has travelled may be a value of distance travelled since the last engine oil change. Therefore, the value of total distance the vehicle 300 has travelled may compensate for the age of the engine oil in the engine and/or consumption of engine oil during operation of the vehicle 300 over the total distance travelled since the last oil change.

The determination of the total distance the vehicle 600 has travelled may be used to compensate for wear on the engine components which may lead to increased fuel entering the engine oil, however, rather than using a determination of a total distance the vehicle 300 has travelled, an engine wear parameter based on historic engine loads over periods of operation of the engine can be determined and used to compensate the amount or proportion of fuel that may have entered or flowed into the engine oil in the cold start phase of engine operation.

Therefore, engine wear parameters based on historic engine loads over periods of operation of the engine may be used in the calculation of the amount or proportion of fuel that may enter or flow into the engine oil in the cold start phase of engine operation.

Each of the parameters affecting the amount or proportion of fuel that may enter or flow into the engine oil may have a corresponding correction factor to be applied to the calculation of excess fuel that has been injected but not combusted, and therefore assumed to have entered the engine oil. The value resulting from the application of the correction factors to the calculation of assumed amount of fuel entering the engine oil is a compensated amount of fuel which is assumed to have entered the engine oil.

At block 510, an amount of fuel flow into the engine oil during one or more enrichment phases of engine operation may be determined, where the engine is operated at a high speed and high load that requires a target lambda value to be less than 1. The determination of high speed engine operation depends on the engine to which the method is applied, and may, for example, be an engine speed above 4500 revolutions per minute. The determination of high load depends on the engine to which the method is applied, and may, for example, be a load greater than 60% of maximum engine torque output.

Such an enrichment phase may define component protection enrichment, where components of the engine can be protected from possible detrimental effects of running the engine at high speed and high loads, which may be especially prevalent in a hybrid electric vehicle 600, where the engine may be started whilst high loads are being demanded by the driver of the vehicle 600, such as in an overtaking manoeuvre when the vehicle 600 is already moving under electric only power, at or towards the limit of electric only power delivery.

During the one or more enrichment phases, additional fuel is injected into the engine to reduce a temperature of one or more cylinders of the engine. Since the combustion of the fuel is not stoichiometric due to the target lambda value being less than 1, there is excess fuel entering the cylinders which is then unburned. This excess unburned fuel vaporises on the cylinder walls and cools them which decreases the exhaust gas temperature. Some of this excess fuel may be transported into the engine oil during operation of the engine.

The additional fuel injected into the engine during the one or more enrichment phases may also reduce a temperature of one or more of: an exhaust manifold; and a turbocharger of the engine. Thus components of the engine can be protected in the enrichment phase by the cooling of the engine components through the introduction of excess fuel.

The amount of fuel flow into the engine oil during the one or more enrichment phases may be determined from an exhaust soot mass flow rate which is calculated from engine speed and engine load. An exhaust soot generation map, model, or look up table, can be defined in terms of the engine speed and engine load, and can be used to determine a base exhaust soot mass flow rate. A high exhaust soot mass flow rate is observed at the high engine speed and high engine load condition of the enrichment phase.

The exhaust soot mass flow rate correlates to a rate of fuel flow into the engine oil during the one or more enrichment phases, the amount of fuel flow into the engine oil being calculated from the rate of fuel flow into the engine oil integrated over time.

At block 515 an amount of fuel evaporated from the engine oil during one or more phases of vehicle operation with the engine on is determined. An amount of fuel which is evaporated from the engine oil during the one or more phases of vehicle operation with the engine on is dependent on an engine oil temperature. When the engine oil is above a threshold oil temperature for fuel evaporation, evaporation of the fuel from the engine oil will occur, or is considered to occur. The threshold oil temperature may be, for example 40° C., which temperature may be a vapour temperature of the fuel in the oil. A greater amount of fuel is evaporated from the engine oil at a higher engine oil temperature than a lower engine oil temperature. That is, there is a higher rate of fuel evaporation at higher engine oil temperatures, relative to lower engine oil temperatures. For example, the evaporation rate at 100° C. may be approximately six times greater than the evaporation rate at 40° C.

At block 520 an amount of fuel evaporated from the engine oil during one or more phases of vehicle operation with the engine off is determined. An amount of fuel which is evaporated from the engine oil during the one or more phases of vehicle operation with the engine off is dependent on an engine oil temperature. When the engine oil is above a threshold oil temperature for fuel evaporation, evaporation of the fuel from the engine oil will occur. A greater amount of fuel is evaporated from the engine oil at a higher engine oil temperature than a lower engine oil temperature.

Therefore, when the engine has been operating such that the engine oil temperature exceeds the threshold oil temperature for fuel evaporation, evaporation of the fuel from the engine oil will occur, or be considered to occur. Once the engine ceases to operate, or is put into an engine shut-off condition, whereby further heat from combustion events and component movement is not being generated, the engine oil begins to cool. As the engine oil cools, the rate of fuel evaporation from the engine oil slows until the engine oil temperature reaches the threshold oil temperature for fuel evaporation.

There can be many occurrences of engine shut-off events during a vehicle journey where the vehicle 600, which may be a hybrid electric vehicle 600 such as a plug-in hybrid electric vehicle, will operate only using electric power, such as when the vehicle 600 slows to creep speeds, when the vehicle 600 stops, for example at road junctions or traffic lights, or if a demand for acceleration is removed, or significantly reduced, at low to medium speeds.

The amount of fuel evaporated from the engine oil may be calculated by integrating a rate of fuel evaporation from the engine oil over time. The rate of fuel evaporation at any given point in time is dependent on oil temperature at that given point in time and can be a calibrated factor for an engine.

The fuel evaporated from the engine oil, either during engine operation or once the engine ceases to operate following engine shut-off, may leave the engine via a crankcase ventilation system. The crankcase ventilation system allows evaporated fuel to recirculate into an air intake of the engine to be combusted. During one or more phases of vehicle operation with the engine on, the crankcase ventilation system continuously allows the fuel evaporated from the engine oil to leave the engine. When the engine is in a shut-off condition, an amount of evaporated fuel may be recirculated into the air intake of the engine to be combusted at the next engine start. This amount of evaporated fuel may be assumed to leave the engine at the next engine start.

In some embodiments, the crankcase ventilation system may comprise a valve. During one or more phases of vehicle operation with the engine off, that is in a shut-off condition, the valve is configured to close after a time delay following engine shut-off. This time delay can be varied with engine oil temperature, such that at higher engine oil temperatures the time delay can be larger than the time delay when the engine oil temperature is lower allowing for greater evaporation at higher engine oil temperatures. The time delay may be determined dependent upon the engine oil temperature at the time of engine shut-off.

The time delay may be mapped against engine oil temperature to provide a series of time delay values. Alternatively, the time delay may be determinable from an equation defining a relationship between engine oil temperature and the time delay.

A control signal or data may be sent to the crankcase ventilation system valve to operate the valve or sent to another vehicle controller in order to operate the valve.

Alternatively, the time delay may be a period from engine shut-off until a predetermined minimum engine oil temperature is reached.

The rate of fuel evaporation from the engine oil is determined and the amount of fuel evaporation from the engine oil is calculated by integrating the rate of fuel evaporation from the engine oil over time. The rate of fuel evaporation from the engine oil may be determined using knowledge of the temperature of the engine oil and knowledge of the amount of fuel in the engine oil. The amount of fuel in the engine oil may be defined by a variable, to be varied dependent on the estimated fuel flow into the engine oil and estimated fuel flow out of the engine oil, as defined in the previous blocks of the method.

At block 525 a percentage of fuel in the engine oil is determined from the amount of fuel flow into the engine oil and the amount of fuel flow evaporated from the engine oil. The difference between the amount of fuel flow into the engine oil and the amount of fuel evaporated from the engine oil provides a value for a mass of fuel in the engine oil. The percentage of fuel in the engine oil is determined from the mass of fuel in the engine oil as a percentage of a total mass of engine oil.

In order to calculate the percentage of fuel in the engine oil the total amount of fuel in the engine oil is determined by subtracting the amount of fuel estimated to have evaporated from the engine oil from the amount of fuel estimated to have entered the engine oil, and the total amount of engine oil may be determined using, for example, an oil level sensor. Such an oil level sensor may be, for example, in the form of a Hall Effect sensor, an ultrasonic sensor, or a float sensor. The amount of engine oil may be calculated using an engine oil consumption model, for example. The total amount of engine oil and the total amount of fuel in the engine oil can then be used to determine the total percentage of fuel in the engine oil.

At block 530 a determination is made as to whether the percentage of fuel in oil exceeds a first fuel in oil threshold. If the percentage of fuel in oil does not exceed the first fuel in oil threshold, then normal vehicle operation is maintained at block 535. If the percentage of fuel in oil exceeds a first fuel in oil threshold a determination is made, at block 540, as to whether the percentage of fuel in oil exceeds a second fuel in oil threshold.

Vehicle operation is modified based on the percentage of fuel in the engine oil exceeding a first fuel in oil threshold or a second fuel in oil threshold. The first fuel in oil threshold may be 7%. The second fuel in oil threshold is a value between 8% and 10%, for example, the second fuel in oil threshold may be 9%. This allows for the vehicle to be operated in such a manner to mitigate fuel in the engine oil, for example, by controlling operation of the engine to provide more evaporation of fuel from the engine oil, or to reduce or prevent more fuel from flowing into the engine oil.

When the percentage of fuel in the engine oil exceeds the first fuel in oil threshold and is less than the second fuel in oil threshold, an engine stop is inhibited at block 560 unless the vehicle speed is below a first threshold vehicle speed, determined at block 545, or braking of the vehicle is effected at a vehicle speed below a second threshold vehicle speed, determined at block 555.

If the vehicle speed is below a first threshold vehicle speed, as determined at block 545, or braking of the vehicle is effected at a vehicle speed below a second threshold vehicle speed, as determined at block 555, then normal vehicle operation can continue at block 550, that is, operation of the vehicle without restriction.

Therefore, when the engine is on, or running, the engine is maintained in an on, or running, condition, which allows for the temperature of the engine oil to rise in order to lead to evaporation of fuel from the engine oil. Elements of electric vehicle operation are however maintained in several scenarios, the first being allowing the engine to switch off when the vehicle speed reduces to an idle or creep speed, and the second being allowing the engine to switch off if the vehicle is driving in slow to medium speed conditions and the vehicle is suddenly braked.

The first threshold vehicle speed may be a value for an idle or creep speed of the vehicle and may be, for example, between 1 and 15 kph. The second threshold vehicle speed is a value between 15 and 50 kph, equating to a slow to medium vehicle speed, above the idle or creep speed. In some embodiments, the second threshold speed may be a variable dependent on the braking force applied, such that the engine may be allowed to switch off at higher speeds when greater braking force is applied to the vehicle. Thus this method allows for the engine to switch off under certain limited conditions.

A user interface of the vehicle, which may be, for example, a user display in a centre console, instrument panel or instrument cluster, may indicate, for the period that the engine stop is inhibited, that a user selectable electric vehicle mode is unavailable. A user interface may display the restriction in the use of selectable electric vehicle mode, or unavailability of the selectable electric vehicle mode, in some visible way for the driver of the vehicle. For example, the restriction in the use of selectable electric vehicle mode can be indicated by greying out a selectable electric vehicle icon, or by not illuminating a selectable electric vehicle icon, or by displaying a selectable electric vehicle icon in a different colour, for example red. In this manner the vehicle can identify that selectable electric vehicle mode is suspended, or unavailable, to the user so that the user does not think there is a vehicle fault.

When the percentage of fuel in oil exceeds a first fuel in oil threshold, the percentage of fuel in oil does not exceed a second fuel in oil threshold, and an engine stop is prohibited or inhibited, a requested torque value from a user of the vehicle may be modified, in block 565, by applying a torque multiplication value to the requested torque value. The modified requested torque value may then be applied at the engine when the user requests torque.

The torque multiplication value may be any value below 1, which will provide, to some degree reduced fuel flow into the engine oil. The lower the torque multiplication value, the greater effect will be experienced by the driver of the vehicle. A lower multiplication value will have a greater beneficial effect on reducing fuel flow into the engine oil, but also provides the greatest impact on the driving experience for the driver of the vehicle. A higher multiplication value will have a lesser beneficial effect on reducing fuel flow into the engine oil, but also provides the least impact on the driving experience for the driver of the vehicle. A reasonable compromise between benefit in terms of reducing fuel flow into the engine oil and impact on the driving experience for the driver of the vehicle is to provide a multiplication value of 0.5.

When the percentage of fuel in the engine oil exceeds the second fuel in oil threshold, the vehicle speed is compared to a threshold vehicle speed value at block 570 to see if the vehicle speed exceeds the threshold vehicle speed. If the vehicle speed does not exceed the threshold vehicle speed, then normal vehicle operation is maintained at block 572, that is, operation of the vehicle can continue without restriction.

When the percentage of fuel in the engine oil exceeds the second fuel in oil threshold and the vehicle speed exceeds a threshold vehicle speed value in block 570, the engine is arranged to be in a running condition, which may require a start of the engine. In particular, the engine may be run for a predetermined warm up duration or until the temperature of the engine oil exceeds a predetermined warm up temperature, as shown in block 575.

The threshold vehicle speed value may be selected from a value in the range of 15 to 25 kph, more preferably between 20 and 25 kph. For example the threshold vehicle speed may be 20 kph or 22 kph. By setting a threshold vehicle speed, it is more likely that the vehicle is to be driven for a substantial period of time, as opposed to merely being briefly moved, when the benefit of starting the engine to warm up the engine oil, and ultimately cause evaporation of fuel from the engine oil, can be achieved.

When the vehicle speed reduces to zero, the engine may be switched off. The engine will then switch back on to resume running of the engine when the vehicle speed next exceeds the threshold vehicle speed value.

The predetermined warm up duration may be between 900 and 1300 seconds, for example 1100 seconds. The predetermined warm up temperature may be between 90° C. and 100° C., for example 95° C. Therefore, once a forced engine start is initiated due to the fuel in oil percentage being above the second fuel in oil threshold, the engine will stay on for such a predetermined warm up duration or until such a predetermined warm up temperature is reached before allowing the engine to switch off.

At block 585, when the vehicle speed is detected to have reduced to zero before the engine has run for the predetermined warm up duration or before the temperature of the engine oil exceeds the predetermined warm up temperature, the engine may be switched off at block 590. The engine will then switch back on, at block 595, to resume running of the engine when the vehicle speed next exceeds the threshold vehicle speed value. Therefore, once a forced engine start is initiated the engine will stay on for such a predetermined warm up duration or until such a predetermined warm up temperature is reached before allowing the engine to switch off, unless the vehicle speed reduces to zero. If the vehicle speed reduces to zero, then the engine may switch off, however, it then resumes running when the vehicle speed exceeds the threshold vehicle speed value again. The engine will continue to run for the remainder of the predetermined warm up duration or until the engine oil exceeds the predetermined warm up temperature. In an alternative embodiment, if the vehicle speed reaches zero before the end of the predetermined warm up duration or before the engine oil exceeds the predetermined warm up temperature, then when the vehicle speed exceeds the threshold vehicle speed value again, the engine will be run for the whole of the predetermined warm up duration, that is effectively reset the warm up period required, or until the predetermined warm up temperature is reached before allowing the engine to switch off, unless the vehicle speed reduces to zero again before those parameters are satisfied.

Optionally, a load may be continued to be applied to the engine, at block 580 when a user requested torque is reduced to zero. The torque requested for the engine, when the user requested torque reduces to zero, may be between a minimum torque value and a maximum torque value. The minimum torque value may be 70 Nm and the maximum torque value may be 200 Nm. Such applied force positive torque, applied when the driver reduces the driver requested torque to zero, means that the engine is not switched off, nor is fuel cut in order to not produce any torque. Instead a load is continued to be applied to the engine in a window of torque values. The minimum torque value, for example 70 Nm, maintains a load during tip out. The maximum torque value, for example 200 Nm, avoids high loads that may instigate fuel enrichment phases, such as exhibited during component protection enrichment, which may introduce more fuel into the engine oil.

In an alternative embodiment the torque requested for the engine, following the number of detected events reaching the threshold count value, is between the minimum torque value and the maximum torque value when the user requested torque falls below the minimum torque value. For example the torque requested for the engine is between 70 Nm and 200 Nm when the user requested torque falls below 70 Nm.

When the engine is running, until the end of the predetermined warm up duration or until the temperature of the engine oil exceeds a predetermined warm up temperature, a display of the vehicle may indicate that a user selectable electric vehicle mode is unavailable.

However, the selectable electric vehicle mode is suspended, or unavailable, for the predetermined warm up duration, or until the temperature of the engine oil exceeds a predetermined warm up temperature. A user interface may display the restriction in the use of selectable electric vehicle mode, or unavailability of the selectable electric vehicle mode, in some visible way for the driver of the vehicle. For example, the restriction in the use of selectable electric vehicle mode can be indicated by greying out a selectable electric vehicle icon, or by not illuminating a selectable electric vehicle icon, or by displaying a selectable electric vehicle icon in a different colour, for example red. In this manner the vehicle can identify that selectable electric vehicle mode is suspended, or unavailable, to the user so that the user does not think there is a vehicle fault.

Optionally, a service interval for the vehicle 600 may be modified based on the percentage of fuel in the engine oil. The service interval may define a time or distance to the next vehicle service, in particular, to the next oil change for the vehicle 600.

The service interval for the vehicle 600 may be modified dependent upon a current detected fuel in oil value for the engine oil. The service interval may be modified based, at least in part, upon a time since last oil change or distance travelled since last oil change. Such a modification can be automatically applied based on, at least, real time data relating to the current detected fuel in oil value for the engine oil determined using the above described method.

If the vehicle 600 has been subjected to frequent short journeys, leading to a high level of cold start phases, and/or has been subjected to frequent events requiring component protection enrichment, leading to a high level of enrichment phases, then the service interval may be shorter than if the vehicle 600 has not been subjected to, or has been subjected to few or infrequent, short journeys and/or has not been subjected to, or has been subjected to few or infrequent, events requiring component protection enrichment, since more oil will have entered into the engine oil during those cold start phases and enrichment phases. This may be offset or opposed by the operation of the engine for longer periods leading to more evaporation of fuel from the engine oil.

The modified service interval may be predicted dependent upon an estimation of the time or distance the vehicle 600 can be driven until a predetermined percentage of fuel in oil limit is exceeded.

In some embodiments, the modified service interval may be output to the user, for example on a user display in the vehicle 600. Where the modified service interval is greater than a standard service interval, the standard service interval may be output to the user display. In alternative embodiments, the modified service interval may be output to the user, for example on the user display in the vehicle 600, even if it exceeds the standard service interval. This allows for extending the service interval in certain circumstances.

The modified service interval may therefore reduce as the percentage of fuel in the engine oil increases, and by the various mitigation strategies herein described my increase as the percentage of fuel in the engine oil decreases. The predetermined percentage of fuel in oil limit, where it is determined that an oil change is required, may be a value between 7% and 10% fuel in oil. In one example the predetermined percentage of fuel in oil limit is 10%.

Optionally, a prediction of when the predetermined percentage fuel in oil limit will be exceeded can be made based on the historic data relating to the number of and frequency of cold start phases and/or enrichment phases leading to fuel flowing into the engine oil, and historic data relating to any longer periods of engine operation leading to fuel evaporation, both with the engine on and engine off. This prediction is then used to determine the modified service interval.

The service interval for the vehicle 600 may be modified dependent upon a current detected fuel in oil value for the engine oil and an estimated time to exceed a fuel in oil limit which may be, at least in part, dependent upon historical driving behaviour or driving style.

Using historic data relating to the number of, and frequency of, cold start phases and/or enrichment phases leading to fuel flowing into the engine oil, and historic data relating to any longer periods of engine operation leading to fuel evaporation, the service interval can be modified to provide an expected time to service, that is, a time when the engine oil is required to be changed.

The modified service interval may be predicted dependent upon an estimation of the time or distance the vehicle 600 can be driven until a predetermined percentage of fuel in oil limit is exceeded, based on the historic data.

In some embodiments, if the percentage of fuel in oil reduces below the second fuel in oil threshold but remains above the first fuel in oil threshold, the operation of the engine may continue whereby an engine stop is inhibited unless the vehicle speed is below a first threshold vehicle speed or braking of the vehicle is effected at a vehicle speed below a second threshold vehicle speed.

In some embodiments, if the percentage of fuel in oil reduces below the first fuel in oil threshold, the operation of the vehicle may revert back to normal operation, that is, operation with uninhibited operation of selectable electric vehicle mode and uninhibited operation of the engine.

Figure 10:
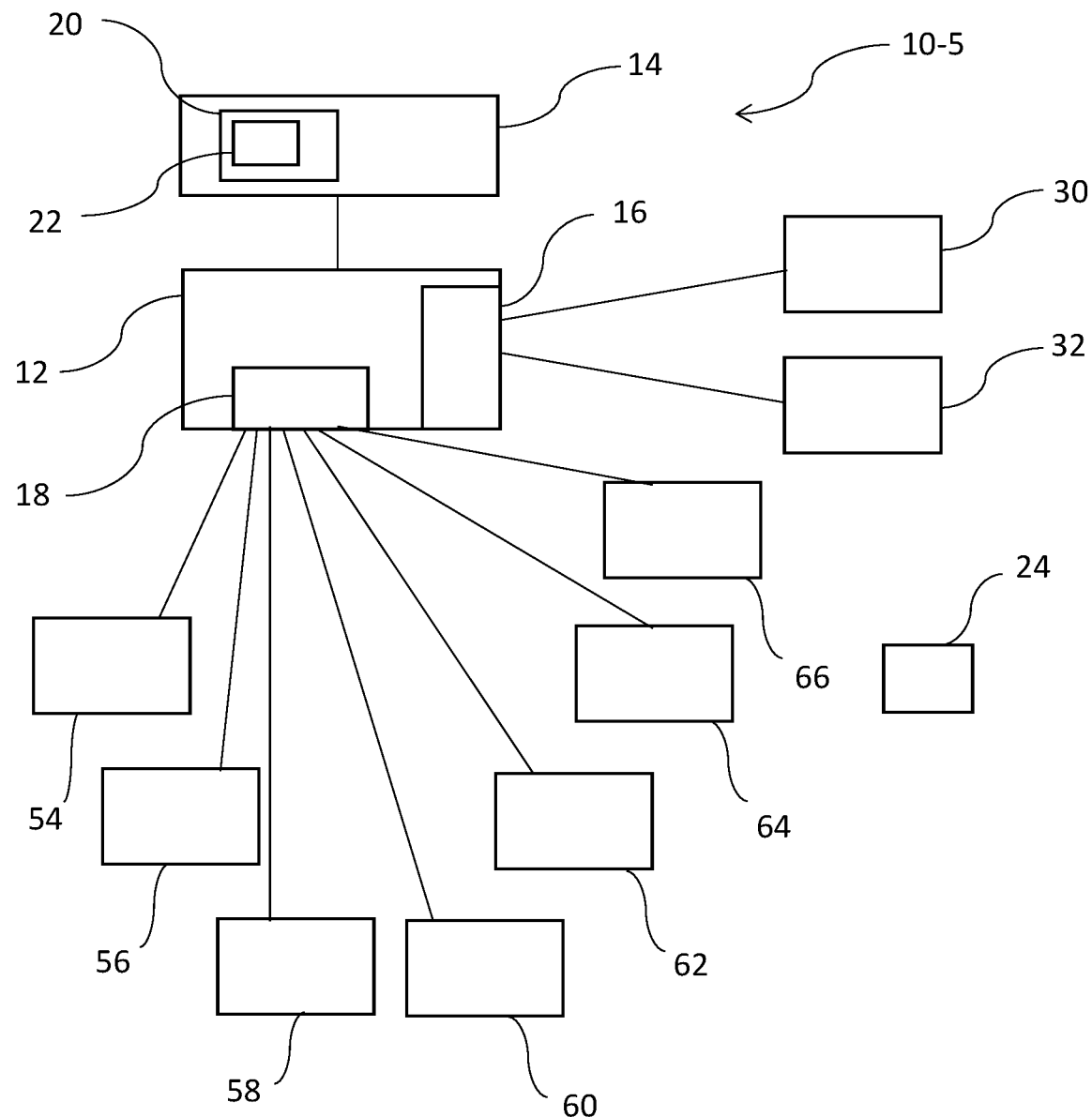
FIG. 10 illustrates a schematic diagram of an apparatus for mitigating fuel in oil according to the embodiment of the invention shown in FIG. 9.

FIG. 10 illustrates an apparatus 10-5 for managing fuel in oil in an engine of a hybrid electric vehicle 600. The apparatus 10-5 comprises components as previously described in relation to apparatus 10-1, 10-2, 10-3, and 10-4, where like reference numerals in the figures indicate like components.

The apparatus 10 comprises processing means 12, which may be in the form of, or comprise, a processor or processing circuitry, which is operable to carry out the blocks of the method as previously described, and may form part of one or more systems comprised in a vehicle 600. The processing means 12 may be implemented in hardware alone, have certain aspects in software including firmware alone or can be a combination of hardware and software (including firmware). The processing means 12 may be implemented using instructions that enable hardware functionality, for example, by using executable instructions of a computer program 20 in a general-purpose or special-purpose processing means 12 that may be stored on a computer readable storage medium (disk, memory etc.) to be executed by such a processing means 12.

The processing means 12 is configured to read from and write to storage means 14. The processing means 12 may also comprise an output interface 16 via which data and/or commands are output by the processing means 12. The processing means 12 may also comprise an input interface 18 via which data and/or commands are input to the processing means 12. For example, data relating to the mass of engine oil, lambda sensor measurements, and fuel injection amounts, amongst other data, may be received at the input interface 18.

The apparatus 10-5 may be operably coupled to one or more of an engine oil temperature sensor 54, an engine control unit 56, a vehicle speed sensor 58, a brake sensor 60, a fuel injection system 62, a lambda sensor 64, and user torque request means, such as an accelerator 66 of the vehicle 600, such that measurements of engine oil temperature, operational engine parameters, vehicle speed, a braking function, fuel injection parameters, lambda, and user torque requests, can be received and processed by the processor 12.

The processing means 12 may be coupled to storage means 14, which may be in the form of a volatile or a non-volatile memory, which is arranged or configured to store the operations of the method for execution by the processing means 12, and also to store data relating to the method as herein described.

Where engine wear parameters are based on historic engine loads over periods of operation of the engine, those engine wear parameters may be stored in the storage means 14 for use by the processing means 12 in the calculation of the amount or proportion of fuel that may enter or flow into the engine oil during or after engine operation.

Where the time delay for closure of the crankcase ventilation system valve is mapped against engine oil temperature, the values may be stored as a series of time delay values against engine oil temperature in a look-up table in the storage means 14 on the vehicle 600. Alternatively, the time delay may be determinable from an equation stored in the storage means 14 on the vehicle 600. The processing means 12 may be configured or arranged to operate the crankcase ventilation system valve in accordance with the determined time delay. The processing means 12 may output a control signal 40, for example via the output interface 16, to operate the valve or provide data to another vehicle controller in order to operate the valve.

The amount of fuel in the engine oil may be stored as a variable in the storage means 14 on the vehicle 600, to be varied dependent on the estimated fuel flow into and out of the engine oil as defined in the above blocks of the method.

Look up tables for the correction of exhaust soot mass flow rate based on one or more of the temperature of the engine oil and the ambient air pressure can be stored in the storage means 14, for recall when calculating the exhaust soot mass flow rate for the determination of the fuel flow into the engine oil during the one or more enrichment phases.

Historic data relating to the number of and frequency of cold start phases and/or enrichment phases leading to fuel flowing into the engine oil, and historic data relating to any longer periods of engine operation leading to fuel evaporation, both with the engine on and engine off, may be stored in the storage means 14 and used by the processing means 12 in the prediction of when the predetermined percentage fuel in oil limit will be exceeded.

The storage means 14 stores a computer program 20 comprising computer program instructions 22 (computer program code) for carrying out the above described method, and may output information or control one or more vehicle functions when loaded into the processing means 12. The computer program instructions 22, of the computer program 20, provide the logic and routines that enables the apparatus 10-5 to perform the methods illustrated in FIGS. 9-1 to 9-3 and/or described herein. The processing means 12, by reading the storage means 14, is able to load and execute the computer program 20.

The apparatus 10-5 therefore comprises: at least one processing means 12; and at least one storage means 14 including computer program code, the at least one storage means 14 and the computer program code configured to, with the at least one processing means 12, cause the processing means 12 to: determine an amount of fuel flow into the engine oil during one or more cold start phases of engine operation; determine an amount of fuel flow into the engine oil during one or more enrichment phases of engine operation; determine an amount of fuel evaporated from the engine oil during one or more phases of vehicle operation with the engine on; determine an amount of fuel evaporated from the engine oil during one or more phases of vehicle operation with the engine off; determine a percentage of fuel in the engine oil from the amount of fuel flow into the engine oil and the amount of fuel flow evaporated from the engine oil; and modify vehicle operation based on the percentage of fuel in the engine oil exceeding a first fuel in oil threshold or a second fuel in oil threshold.

The computer program 20 may arrive at the apparatus 10-5 via any suitable delivery mechanism 24. The delivery mechanism 24 may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program 20. The delivery mechanism 24 may be a signal configured to reliably transfer the computer program 20.

In some embodiments, the apparatus 10-5 may further comprise one or more user interface, which may be in the form of display means 30, for example a visual user display or an instrument cluster of the vehicle 600, which may provide a visual indication relating to the status of the engine with regards to a fuel in oil value, and/or be in the form of an auditory interface 32 where a user of the vehicle 600 may be alerted by audible warnings relating to the status of the engine with regards to a fuel in oil value.

Such a status of the engine may relate to a service interval for the vehicle 600 which is dynamically affected by the fuel in oil ratio for the engine oil. For example, the time to next vehicle service can be displayed to a user of the vehicle 600 on a user display 30 and/or given as an audible signal to the user of the vehicle 600 through an auditory interface 32, such that it can be ensured that the engine oil can be changed at an appropriate time. In some embodiments the apparatus 10-5 may additionally or alternatively communicate with a user interface which is external to the vehicle 600 to provide information, relating to the fuel in oil ratio for the engine oil, to a user, for example through an application on a mobile device 34.

The service interval for the vehicle 600 may be modified dependent upon the current detected fuel in oil value for the engine oil and/or an estimated time to exceed a fuel in oil limit which may be, at least in part, dependent upon historical driving behaviour or driving style, as previously described.

Since some of the actions described by the above methods may lead to a reduction of the percentage of fuel in oil in the engine oil, the effect of the above methods may be fed back to update the estimated percentage of fuel in oil which may lead to a different action or method being carried out on the engine by the processor 12.

Although the storage means 14 is illustrated as a single component/circuitry it may be implemented as one or more separate components/circuitry some or all of which may be integrated/removable and/or may provide permanent/semi-permanent/dynamic/cached storage.

Although the processing means 12 is illustrated as a single component/circuitry it may be implemented as one or more separate components/circuitry some or all of which may be integrated/removable. The processing means 12 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 11:
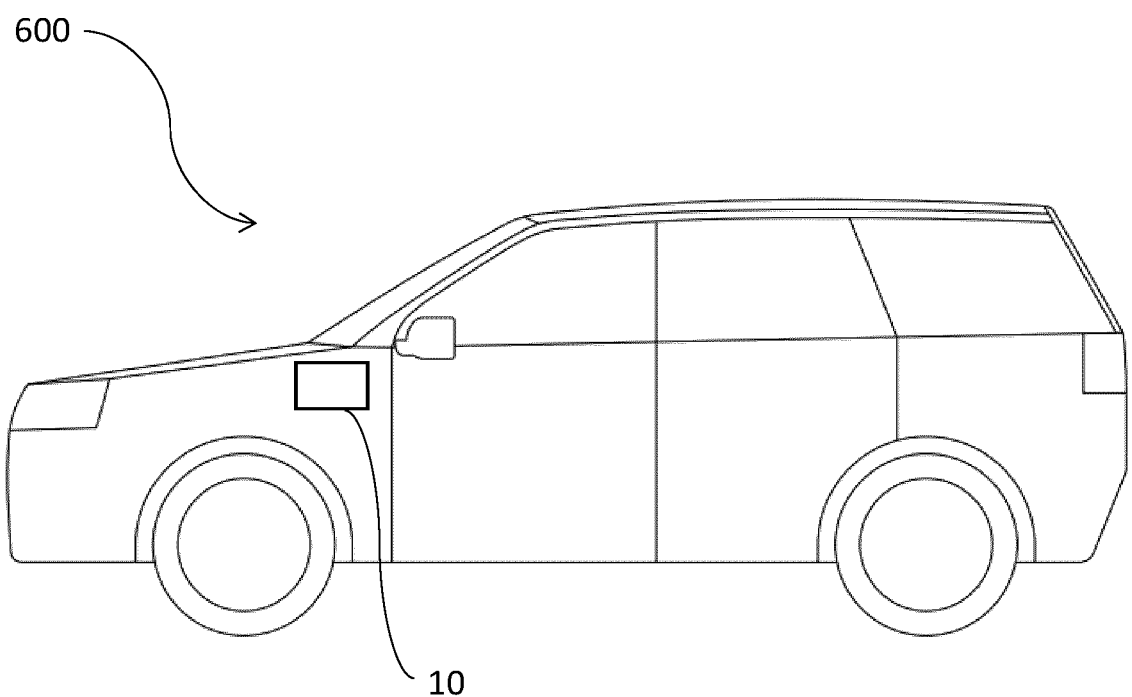
FIG. 11 illustrates a vehicle in accordance with an embodiment of the invention.

FIG. 11 illustrates a vehicle 600 comprising an apparatus 10, which may be any of the aforementioned apparatus 10-1, 10-2, 10-3, 10-4, 10-5, for mitigating fuel in oil in an engine of a hybrid electric vehicle 600.

The blocks illustrated in FIGS. 1, 3, 5, 7, and 9-1 to 9-3 may represent steps in a method and/or sections of code in the computer program 20. The illustration of a particular order to the blocks does not necessarily imply that there is a required or preferred order for the blocks and the order and arrangement of the block may be varied. Furthermore, it may be possible for some blocks to be omitted.

It will be appreciated that various changes and modifications can be made to the present invention without departing from the scope of the present application. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of mitigating fuel in oil in an internal combustion engine of a hybrid electric vehicle, the method comprising:
   detecting a first engine start of a drive cycle when the vehicle speed is greater than zero;
   detecting a temperature of engine oil in the engine at the first engine start of the drive cycle;
   determining if the temperature of the engine oil is below an engine oil temperature threshold; and
   when the temperature of the engine oil is determined to be below the engine oil temperature threshold, inhibiting an engine stop for a first predetermined time period unless the vehicle speed reaches zero.

2. A method of mitigating fuel in oil in an internal combustion engine of a hybrid electric vehicle according to claim 1, wherein the first predetermined time period is a time period between 60 seconds and 120 seconds.

3. A method of mitigating fuel in oil in an internal combustion engine of a hybrid electric vehicle according to claim 1, wherein the first predetermined time period is 90 seconds.

4. A method of mitigating fuel in oil in an internal combustion engine of a hybrid electric vehicle according to claim 1, wherein the engine oil temperature threshold is a value selected between 30° C. and 60° C.

5. A method of mitigating fuel in oil in an internal combustion engine of a hybrid electric vehicle according to claim 4, wherein the engine oil temperature threshold is 45° C.

6. A method of mitigating fuel in oil in an internal combustion engine of a hybrid electric vehicle according to claim 1, wherein a display of the vehicle indicates, for the period that the engine stop is inhibited, that a user selectable electric vehicle mode is unavailable.

7. An apparatus for managing fuel in oil in an engine of a hybrid electric vehicle, the apparatus comprising processing means configured to carry out the method of claim 1.

8. A vehicle comprising an apparatus according to claim 7.

* * * * *